US012548905B2

(12) United States Patent
Ali

(10) Patent No.: US 12,548,905 B2
(45) Date of Patent: Feb. 10, 2026

(54) CHIP CARD WITH RADIOFREQUENCY ANTENNAS

(71) Applicant: IDEMIA FRANCE, Courbevoie (FR)

(72) Inventor: Ahmed Ali, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 26 days.

(21) Appl. No.: 18/777,109

(22) Filed: Jul. 18, 2024

(65) Prior Publication Data

US 2026/0024916 A1 Jan. 22, 2026

(30) Foreign Application Priority Data

Jun. 15, 2023 (FR) ....................................... 2306098

(51) Int. Cl.
*H01Q 1/22* (2006.01)
*H01Q 7/00* (2006.01)

(52) U.S. Cl.
CPC ............. *H01Q 7/00* (2013.01); *H01Q 1/2283* (2013.01)

(58) Field of Classification Search
CPC ............................... H01Q 7/00; H01Q 1/2283
See application file for complete search history.

(56) References Cited

U.S. PATENT DOCUMENTS 12,159,180 B1 * 12/2024 Finn .................... G06K 19/0723
2021/0081748 A1 * 3/2021 Finn .................. G06K 19/07722
2024/0211716 A1 * 6/2024 Ali .................... G06K 19/07783
2024/0386232 A1 * 11/2024 Ali ............................ H01Q 7/00

FOREIGN PATENT DOCUMENTS

KR 10-2018-0019983 A 2/2018
WO WO 2021/030782 A2 2/2021

OTHER PUBLICATIONS

Preliminary Research Report dated Jan. 15, 2024, issued in counterpart FR Application No. 2306098, (9 pages).

* cited by examiner

*Primary Examiner* — Awat M Salih
(74) *Attorney, Agent, or Firm* — Oblon, McClelland, Maier & Neustadt, L.L.P.

(57) ABSTRACT

A chip card comprising a card body including a metal layer, an RF chip, and a first RF antenna placed in a cut-out zone and connected to the chip. The metal layer has two regions, the first region completely containing the cut-out zone. A first slit connects the cut-out zone to an edge of the first region, a second slit opens onto an edge of the layer or into the cut-out zone and ends in the second region. Two other RF antennas allow coupling to the first antenna. They respectively comprise at least one turn facing the first slit and at least one turn facing the second slit.

20 Claims, 12 Drawing Sheets

| Subject | Parameter | Value | Units |
|---|---|---|---|
| Operational volume | $D_1$ | 3 | cm |
| | $D_2$ | 5 | cm |
| | $S_1$ | 1 | cm |
| | $S_2$ | 2 | cm |

CHIP CARD WITH RADIOFREQUENCY ANTENNAS

CROSS REFERENCE TO RELATED APPLICATIONS

This application claims priority under 35 U.S.C. § 119 or 365 French Patent Application No. 2306098 filed on Jun. 15, 2023. The entire contents of the above application are incorporated herein by reference.

TECHNICAL FIELD

The invention relates to the field of chip cards, and relates more particularly to metal chip cards able to operate in contactless mode.

PRIOR ART

The use of chip cards (or smart cards) is nowadays widespread in everyday life. Such cards are used for example as bank cards, loyalty cards, access cards, etc., and may take various formats depending on their respective uses. Chip cards may be designed to perform various types of functions, and in particular to carry out transactions, such as banking transactions (payments, transfers, etc.), authentication-related transactions, etc.

As is known, a chip card generally comprises a card body that is equipped with an electronic chip that is configured to exchange signals with the outside world and to perform various functions depending on the desired use of the card. To this end, chip cards are equipped with communication means allowing interaction with the outside world, and typically with an NFC reader or external reader.

Traditionally, a chip card is designed to cooperate with an external reader by way of external contacts accessible on the surface of the card. An external reader is thus able to position appropriate contact pins on the external contacts of the card in order to set up a contact-based communication.

More recently, contactless chip cards have seen increasing growth due to the greater speed and simplicity of contactless transactions. To this end, contactless cards incorporate a radiofrequency (RF) antenna allowing RF signals to be exchanged with an external NFC reader (NFC standing for Near Field Communication). This RF antenna is generally composed of a plurality of conductive turns that extend in the body of the card.

The structure and the appearance of chip cards may vary on a case-by-case basis. In particular, metal chip cards are seeing increasing interest notably because of the attractive aesthetic appearance of these cards (metallic reflections, brushed surface effect, etc.), the impression of quality that they may give (the appreciable weight of the metal, high-class aesthetics), or the connotation of prestige associated therewith for their users. Due in particular to their considerable weight and the impression of high quality that they give, these cards are preferred by certain users as they may serve as a social marker and differentiating element.

However, it has been observed that the presence of metal in the body of a chip card causes major difficulties when the card incorporates an RF antenna so as to be able to operate in contactless mode. The metal acts as an electromagnetic shield and blocks or obstructs the RF signals exchanged by the RF antenna with the outside world. The metal present in the card body may thus impede contactless communication between a chip card and an external NFC reader, and for example hinder a contactless transaction (a payment or the like).

This problem in particular arises when the card is moved in the plane offset from the centre of the NFC reader. This is very common in the RFID HF NFC environment, for example during a payment when the user moves their card towards the reader of the point of sale in an off-centred manner.

FIG. 16 for example illustrates an operational volume in the entirety of which the card must be operational in order to meet a standard defined by the international organization EMVCo. Those skilled in the art may refer to the document "EMV Contactless Specifications for Payment Systems, Book D: EMV Contactless Communication Protocol Specification. Version 2.6, March 2016.". One of the objectives of EMVCo is to guarantee the interoperability and compatibility of chip cards and chip card readers under defined operating conditions.

This operational volume is defined by dimensions $S_1$, $S_2$, $D_1$, $D_2$ that are recalled in FIG. 16. This figure also shows the projection of 9 points of the volume onto a plane. For example, point 6 illustrates a situation in which the centre of the card is offset by 25 mm with respect to the centre of the NFC reader.

As things stand, metal chip cards do not function satisfactorily in the entirety of the EMVCo operational volume, in particular in card positions corresponding to point 6.

There is therefore a need for a high-performance metal (RFID for example) chip card that is simple to manufacture, and that is capable of effective contactless interaction with an external NFC reader, whatever the position of the card with respect to an external NFC reader, under defined operating conditions.

SUMMARY OF THE INVENTION

To this end, the present invention relates to a chip card comprising a chip card comprising a card body of generally rectangular shape formed at least in part by a metal layer comprising a cut-out zone;

- an RF chip;
- a first RF antenna placed in or facing the cut-out zone, said first RF antenna being electrically connected to the RF chip;
- said metal layer consisting of a first region and a second region that are entirely delineated by a straight line parallel to a short side of the card, the first region completely containing the cut-out zone and its area being smaller than the area of the second region,
- a first slit connecting the cut-out zone to a peripheral edge of the first region;
- a second slit opening either onto a peripheral edge of the metal layer or into the cut-out zone, the second slit ending with a closed portion in the second region;
- a second RF antenna electrically insulated from the metal layer and from the first RF antenna and configured to allow coupling to the first antenna, the second antenna comprising at least one turn facing the first slit;
- a third RF antenna electrically insulated from the metal layer, from the first RF antenna and from the second RF antenna and configured to allow coupling to the first antenna, the third antenna comprising at least one turn facing the second slit.

The invention thus provides a high-performance metal (RFID for example) chip card that is simple to manufacture, and that is capable of effective contactless interaction with an external NFC reader, whatever the position and orientation of the card with respect to an external NFC reader.

Highly advantageously, the metal layer therefore comprises at least two slits, a first slit being located in the first region, the second slit being located in the second region.

Preferably, the first slit opens onto a short side of the chip card, as close as possible to the cut-out zone.

Preferably, the second metal slit opens into the cavity and ends in a zone of the card located between the cavity and the centre of the chip card.

Each of these slits allows the magnetic field generated by a card reader to pass through the metal layer, thereby generating an induced current in the turns of the second antenna that are located facing the first slit and an induced current in the turns of the third antenna that are located facing the second slit.

This configuration also allows the turns of the second antenna that are located facing the first slit and the turns of the third antenna that are located facing the second slit to collect an image current induced by a current flowing through the metal layer locally at these slits due to the magnetic field generated by the chip card reader.

As detailed below, because of the continuity of the eddy currents, the two currents collected by these turns of the second antenna, namely the one induced directly by the electromagnetic field passing through the first slit and the one that is an image of a local eddy current flowing through the metal layer, add constructively in terms of phase.

Similarly, the two currents collected by these turns of the third antenna, namely the one induced directly by the electromagnetic field passing through the second slit and the one that is an image of a local eddy current flowing through the metal layer, add constructively in terms of phase.

This configuration allows effective coupling between the two antennas, whatever the operating conditions of the card.

In one embodiment, the second RF antenna comprises:

- a first antenna portion extending facing a peripheral zone of the metal layer, at least one turn of said first antenna portion extending facing the first slit,
- a second antenna portion, electrically connected to the first portion of the second antenna, and extending facing the cut-out zone so as to allow coupling to the first antenna;
- the first portion of the second antenna being configured to collect an image current induced by first eddy currents flowing on an edge through the metal layer when the chip card is subjected to an electromagnetic field under operating conditions of the chip card.

The third RF antenna comprises:

- a first antenna portion arranged at least partially facing the second region of the metal layer, at least one turn of said first antenna portion extending facing the second slit,
- a second antenna portion electrically connected to the first portion of the third antenna, and extending facing the cut-out zone so as to allow coupling to the first antenna;
- the first portion of the third antenna being configured to collect an image current induced by eddy currents flowing through the second region of the metal layer when the chip card is subjected to an electromagnetic field under what are called adverse operating conditions corresponding to only some of said operating conditions.

The path of the second and third antennas is configured such that the current flow flows in the same direction in:

- the first portion of the second antenna;
- the second portion of the second antenna;
- the first portion of the third antenna; and in
- the second portion of the third antenna.

In particular, operating conditions may be adverse when the cut-out zone (or cavity) is relatively far from the maximum-strength field.

The first portion of the second antenna is arranged facing a peripheral zone of the metal layer, and is preferably routed substantially rectangularly so as to follow the outline of the chip card along its four sides, particularly in the first region of the card in the vicinity of the cut-out zone.

Normally, whatever the operating conditions of the card, the magnetic field of the card reader generates a loop of an eddy current that flows along the edge of the card and that induces an image current that is able to be collected by that first portion of the second antenna.

The first portion of the second antenna advantageously makes it possible to harvest the energy of a main loop of the eddy currents flowing along the peripheral edge of the metal layer when the entire surface of the card is exposed to a uniform magnetic field generated by the antenna of a reader of said card, and in particular when the latter is centred with respect to the antenna of the chip card reader.

The first portion of the third antenna for its part makes it possible to efficiently harvest the energy of the eddy currents flowing through the chip card when the chip card is used under less favourable conditions, the card being off-centre with respect to the antenna of the card reader.

Specifically, when the card is off-centre with respect to the antenna of the reader so that the cut-out zone and the first antenna are far from the centre of the antenna of the reader, the main loop of the eddy current is mainly confined to the second region of the metal layer, then facing the maximum-strength magnetic field.

In one embodiment, the second region comprises a special zone for exploitation of eddy currents, one or more turns of the third antenna being located facing the second slit in this special zone.

In one embodiment, the special zone for exploitation of eddy currents is a disc centred on said card and the radius of which corresponds to the radius of an operational volume of said card.

This embodiment makes it possible to guarantee that, whatever the operating conditions of the chip card, the second slit of the metal layer will itself be located in this operational zone and that a main loop of the eddy current will flow around the edge of this slit.

In one embodiment, the chip card complies with the EMVCo standard, the zone for exploitation of eddy currents being a disc of 25 mm radius centred on said card.

When the chip card is subjected to a magnetic field, the combined action:

(i) of the image current routed from the first portion of the second antenna and/or the first portion of the third antenna, on the one hand, and (ii) of a current induced in the second portion of the second antenna and/or in the second portion of the third antenna by the magnetic field received through the metal layer, on the other hand, makes it possible to maximize the amount of energy collected in the second RF antenna and/or in the third RF antenna from the magnetic field, and therefore to guarantee high-performance magnetic coupling between the first RF antenna and the second and/or third RF antenna, thereby making it possible to deliver a maximum amount of energy to the RF chip connected to the first RF antenna.

In operation, under the effect of the magnetic field to which the chip card is subjected, the RF chip is thus capable of using the second and/or the third RF antenna coupled to the first RF antenna to communicate with an external NFC reader (and in particular to transmit RF signals to and/or receive RF signals from the NFC reader). When a user presents the chip card to the NFC reader, under defined operating conditions, a contactless communication may thus be set up between the NFC reader and the chip card, whatever the orientation of the latter with respect to the NFC reader. Specifically, eddy currents are generated in the metal layer whatever the orientation of the chip card relative to the NFC reader. Similarly, whatever face of the chip card is presented in front of the NFC reader, the second portion of the second antenna and the second portion of the third antenna are capable of collecting a current component induced by the magnetic field in the cut-out zone.

According to one particular embodiment, the second and third RF antennas are configured so that their second portions extend exclusively facing the cut-out zone.

According to one particular embodiment, the first RF antenna is placed facing the cut-out zone so that the cut-out zone lies in between the first antenna, on the one hand, and the second and third RF antennas, on the other hand, so as to allow magnetic coupling between the first antenna and the second and third antennas.

According to one particular embodiment, the second and third RF antennas are electrically insulated from the metal layer and from the first RF antenna by an insulating layer placed in between the second and third RF antennas, on the one hand, and the metal layer and the cut-out zone, on the other hand.

According to one particular embodiment, the chip card furthermore comprises an electronic module comprising the RF chip, said electronic module being arranged in or facing the cut-out zone.

According to one particular embodiment, the first and second portions of the second RF antenna are connected in parallel with a first capacitive component.

According to one particular embodiment, the first and second portions of the third RF antenna are connected in parallel with a second capacitive component, independent of the first capacitive component.

According to one particular embodiment, the magnetic coupling allows the RF chip to set up a contactless communication with the world outside the chip card using the second and/or the third RF antenna coupled to the first RF antenna.

In one embodiment, the metal layer is at least partially, preferably entirely covered by a coating that is more conductive than the metal layer, for example made of copper, silver or gold. The thickness of the coating is preferably greater than the skin depth of said coating.

For example, the conductivity of the coating is greater than 3.5×107 S/m.

The invention also relates to a process for manufacturing a chip card of generally rectangular shape from a card body formed at least in part by a metal layer, said metal layer comprising a cut-out zone, the metal layer consisting of a first region and a second region entirely delineated by a straight line parallel to a short side of the card, the first region completely containing the cut-out zone and its area being smaller than the area of the second region, a first slit in the metal layer connecting the cut-out zone to a peripheral edge of the metal layer of the first region and a second slit in the metal layer opening either onto a peripheral edge of the metal layer or into the cut-out zone, the second slit ending with a closed portion in the second region, the process comprising:

- forming, on or in the card body, a first RF antenna in or facing the cut-out zone of the metal layer;
- assembling an RF chip with the card body so that the RF chip is electrically connected to the first RF antenna; and
- forming, on or in the card body, a second RF antenna so that the second RF antenna is electrically insulated from the metal layer and from the first RF antenna, the second antenna being configured to allow coupling to the first antenna, the second antenna comprising at least one turn located facing the first slit;
- forming, on or in the card body, a third RF antenna so that the third RF antenna is electrically insulated from the metal layer, from the first RF antenna and from the second RF antenna, the third antenna being configured to allow coupling to the first antenna, the third antenna comprising at least one turn located facing the second slit.

BRIEF DESCRIPTION OF THE DRAWINGS

Other features and advantages of the present invention will become apparent from the description given below, with reference to the appended drawings, which illustrate exemplary embodiments thereof that are completely non-limiting in nature. In the figures.

DESCRIPTION OF EMBODIMENTS

Figure 1:
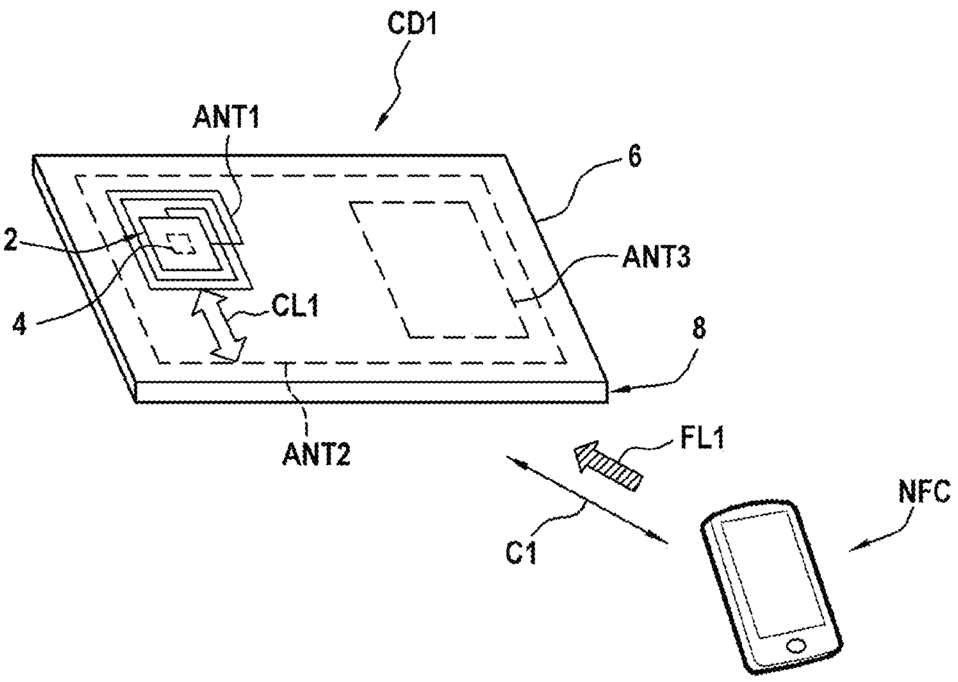
FIG. 1 schematically shows a chip card interacting with an NFC reader, according to at least one particular embodiment of the invention.

As indicated above, the invention relates to metal chip cards configured to operate in contactless mode, and also relates to the manufacture of such chip cards. In the present document, a "metal chip card" is a chip card comprising a metal or a combination (alloy) of metals, for example taking the form of a metal layer or of a plurality of metal layers.

As indicated above, a contactless chip card is configured by nature to communicate contactlessly with the outside world, and more particularly with an external NFC reader. To this end, a contactless chip card incorporates a radiofrequency (RF) antenna for exchanging (receiving and/or transmitting) RF signals with an external NFC reader. Such a chip card may furthermore have the capacity to also operate in contact-based mode, using external contacts provided for this purpose on the surface of the card: "dual" cards (or cards with a dual communication interface) are then referred to, these cards thus being capable of operating in contactless mode and in contact-based mode.

There is nowadays strong demand from users for metal chip cards, in particular for the reasons mentioned above (aesthetic aspects, impression of quality, prestige, etc.). In particular, it is desirable to produce chip cards in which the bulk (or a substantial part) of the card body is made of metal, or at least in which the card body comprises a metal plate (or metal layer), in order to obtain a certain uniformity and quality in the visual and aesthetic appearance of the card.

However, when a contactless chip card comprises a metal layer and an RF antenna placed on or in the vicinity of one of the faces of the metal layer, it has been observed that this metal layer disrupts contactless communication between the RF antenna and the outside world, in particular when the metal layer is placed between the RF antenna and the external NFC reader with which the chip card is attempting to communicate, because of the electromagnetic shielding induced by the metal layer. Thus, depending on the position and orientation of the card with respect to the reader, it may or may not be possible to perform a contactless transaction between a metal chip card and an external NFC reader. In certain cases, a transaction is possible if the chip card is presented so that the antenna is placed on the side of the NFC reader (without the metal layer being interposed between the two), but RF communication is disrupted, or even impossible, if the metal layer forms an electromagnetic barrier between the RF antenna of the card and the NFC reader (the metal plate acts as an electromagnetic barrier between the RF chip and the NFC reader). However, for RF communications to be possible between a metal chip card and an external NFC reader, it is generally necessary for the card to comprise ferrite in order to limit the electromagnetic disruption caused by the metal portion. Without ferrite, even if a metal chip card is correctly oriented relative to an external NFC reader, it is generally not possible to properly exchange RF communications between the card and the NFC reader, thus making any transaction impossible (or at least difficult).

The invention in particular intends to overcome the aforementioned drawbacks and problems. To this end, the invention relates to a chip card comprising a metal layer and a particular antenna structure comprising three RF antennas, namely a first RF antenna electrically connected to an RF chip of the card, and two RF antennas each extending partially facing the metal layer so as to collect an image current induced by eddy currents flowing through the metal layer when the card is subjected to an electromagnetic field. Each of these two RF antennas comprises a portion configured to allow magnetic coupling of this antenna to the first RF antenna. To this end, the metal layer comprises a cut-out zone, the first RF antenna being positioned in or facing this cut-out zone, and one portion of each of the other two RF antennas is positioned facing the cut-out zone so as to allow magnetic coupling to the first RF antenna to be established. By establishing such coupling through the cut-out zone, the RF chip of the card may thus use the second RF antenna to communicate contactlessly with the outside world. At least two slits are furthermore provided in the metal layer, each for facilitating magnetic coupling of at least one of the other two antennas to the first RF antenna whatever the operating conditions of the card.

To this end, the present invention relates to a chip card comprising a card body of generally rectangular shape formed at least in part by a metal layer comprising a cut-out zone, an RF chip, and a first RF antenna placed in or facing the cut-out zone, said first RF antenna being electrically connected to the RF chip, the metal layer consisting of a first region and a second region that are entirely delineated by a straight line parallel to a short side of the card, the first region completely containing the cut-out zone and its area being smaller than the area of the second region, a first slit connecting the cut-out zone to a peripheral edge of the first region, a second slit opening either onto a peripheral edge of the metal layer or into the cut-out zone, the second slit ending with a closed portion in the second region; a second RF antenna electrically insulated from the metal layer and from the first RF antenna and configured to allow coupling to the first antenna, the second antenna comprising at least one turn facing the first slit, and a third RF antenna electrically insulated from the metal layer, from the first RF antenna and from the second RF antenna and configured to allow coupling to the first antenna, the third antenna comprising at least one turn facing the second slit.

The invention also relates to a process for manufacturing such chip cards. Particular embodiments, and other aspects of the invention, are described in more detail below.

In the present description, exemplary implementations of the invention are described with reference to a "dual" chip card, i.e. a card with a dual communication interface, having the capacity to communicate both in contact-based mode (via external contacts) and in contactless mode (via an RF antenna structure). It will however be noted that the invention is more generally applicable to any chip card configured to communicate contactlessly, irrespectively of whether or not it has the ability to also operate in contact-based mode.

In addition, in the following examples, the chip card is considered to be a bank card, such as a payment card for example. This chip card may comply with the standard ISO 7816 and may operate according to the EMV standard, although neither of these aspects is essential to implementation of the invention. More generally, the invention applies to any metal chip card configured to implement a transaction in contactless mode, including EMV cards or chip cards using another transaction standard, for example the NFC standard (for example according to ISO 14443-2, ISO 10373-6 or "EMV Contactless Certification"), NFC Forum standard. Generally, the chip card of the invention may be configured to carry out a transaction of any type, such as banking transactions (payments, transfers, debits, etc.), authentication-related transactions, etc.

Unless otherwise indicated, elements common to a plurality of figures or analogous elements in a plurality of figures have been designated with the same reference signs and have identical or analogous characteristics, and hence these common or analogous elements have generally not been described more than once for the sake of simplicity.

The terms "first", "second", etc. have been used in this document by arbitrary convention to allow various elements (such as keys, devices, etc.) implemented in the embodiments described below to be identified and distinguished.

FIG. 1 shows a metal chip card CD1 configured to communicate in contactless mode with the outside world, and for example with an external NFC reader (or reader). The chip card CD1 comprises an RF chip 4, a card body 6 and three RF antennas, namely a first RF antenna ANT1, a second RF antenna ANT2 and a third RF antenna ANT3. The RF chip 4 and the three RF antennas ANT1, ANT2 and ANT3 are positioned on or in the card body 6.

The card body 6 is formed at least in part of (or comprises) a metal layer 8. This metal layer 8 may be made of a single metal, such as stainless steel or aluminium for example, or of an alloy of a plurality of different metals. The metal layer 8 may comprise a plurality of metal sublayers. According to one particular example, the card body 6, and more generally the chip card CD1, is devoid of ferrite, this allowing manufacture of the card to be simplified while still ensuring symmetrical operation of the two faces of the card.

The chip card is generally rectangular in shape (the corners being slightly rounded). In the examples considered here, the card body 6 is in ID-1 credit-card format, although the invention may be implemented with other formats.

The RF chip 4 is an electronic chip configured to set up a contactless communication with the external NFC reader using the RF antennas ANT1 and, depending on the operating conditions, at least one of the antennas ANT2, ANT3, as described below. To do this, the RF chip 4 is electronically connected to the first RF antenna ANT1, but each of the RF antennas ANT2 and ANT3 is electrically insulated from the RF chip 4 and from the first RF antenna ANT1. The antennas ANT2 and ANT3 are also electrically insulated from one another.

The antenna ANT1 at least partially faces a portion of the antenna ANT2 and faces at least a portion of the antenna ANT3 so as to allow, depending on the operating conditions, inductive magnetic coupling between the first antenna ANT1 and at least one of the two antennas ANT2 and ANT3, and thus allow the RF chip 4 to use the second RF antenna ANT2 and/or the third RF antenna ANT3 to set up a contactless communication C1 with the external NFC reader, as described in more detail below.

The RF chip 4 may for example comprise a microcontroller (or a processor) configured to set up a contactless communication with the world outside the chip card CD1 (with the external NFC reader in this example) using the first and second RF antennas ANT1, ANT2 (and/or the first and third RF antennas ANT1, ANT3) coupled together by magnetic induction.

Figure 2:
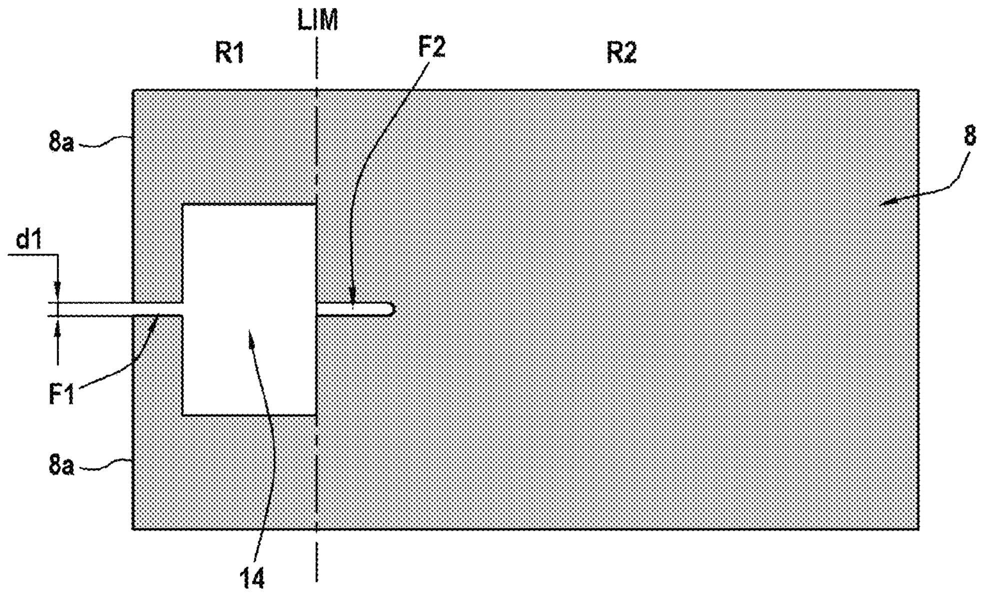
FIG. 2 is a top (or bottom) view of a metal layer of a chip card according to at least one particular embodiment of the invention.

By way of illustration, FIG. 2 shows the one and only metal layer 8 according to one embodiment.

In this example, the metal layer 8 comprises a cut-out zone 14 opening onto a peripheral edge (or outline) 8*a* of the metal layer 8. The cut-out zone 14 is a through-aperture (or zone) formed in the metal layer 8 to allow the first RF antenna ANT1 to be positioned facing a portion of the second RF antenna ANT2 as described below. The shape and dimensions of this cut-out zone 14 may be set on a case-by-case basis. By way of example, the cut-out zone 14 formed in the metal layer 8 is rectangular.

In the present application, and as shown in FIG. 2, the metal layer is considered to consist of two regions R1, R2 delineated by a straight line LIM parallel to a short side of the card, the first region R1 completely containing the cut-out zone 14 and its area being smaller than the area of the second region R2.

In the embodiment shown in FIG. 2, the straight line LIM is tangent to the cut-out zone 14 on its side closest to the centre of the chip card.

In the example shown in FIG. 2, the metal layer 8 comprises a first slit F1 that connects or links a peripheral edge 8*a* of the first region R1 to the cut-out zone 14. In other words, the cut-out zone 14 emerges (or opens) onto the peripheral edge 8*a* via this first slit F1. This first slit F1 is characterized by a distance d1 separating two opposite peripheral edges of the metal layer 8, the value of this distance d1 potentially varying on a case-by-case basis.

The position of the cut-out zone 14 in the metal layer 8 may vary on a case-by-case basis. According to the particular example shown in FIG. 2, the cut-out zone 14 is positioned in the vicinity of a peripheral edge 8*a* of the metal layer 8, this making it possible to ensure effective magnetic coupling FL1 between the RF antennas ANT1 and ANT2, as explained in more detail below.

Other implementations are however possible, in which for example the cut-out zone 14 is positioned at the centre (or substantially at the centre) of the metal layer 8, it being understood that this cut-out zone 14 is always configured to open onto (or be linked to) a peripheral edge 8*a* of the metal layer 8 via a first slit F1.

This cut-out zone 14 more or less corresponds to the zone accommodating the module, this accommodating zone being specified by standards so that terminals are able to connect to the contacts of a module 2 described below.

In one embodiment, the conductive turns of the first RF antenna ANT1 extend in the form of a winding around the RF chip 4 in the cut-out zone 14. This arrangement makes it possible to position the RF chip 4 as close as possible to the first RF antenna ANT1 and thus to limit the complexity of manufacture of the chip card CD1, in particular as regards electrical connection between the RF chip 4 and the first antenna ANT1.

Particular embodiments in which the metal layer 8 comprises a cut-out zone 14 with the configuration illustrated in FIG. 2 will now be considered.

Figure 3:
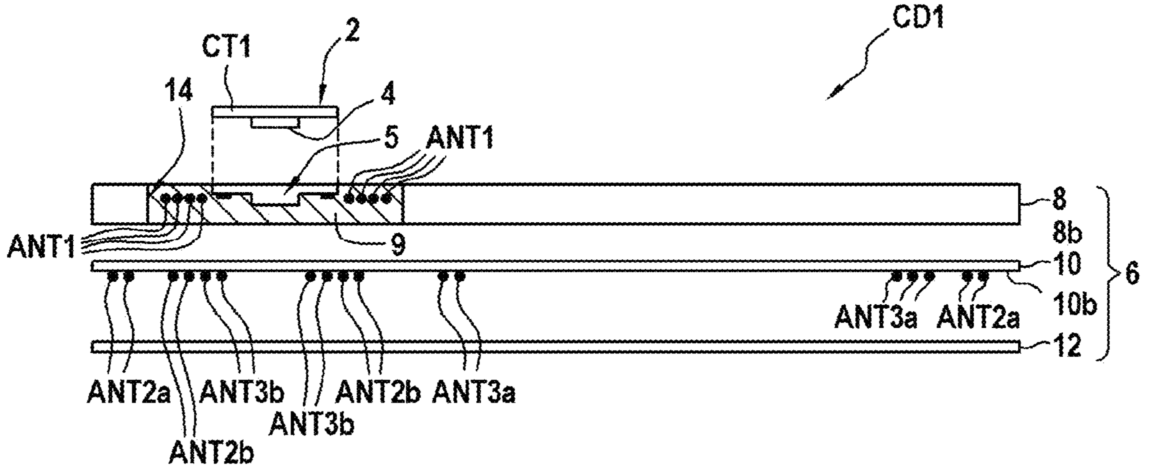
FIG. 3 is an exploded cross-sectional view schematically showing the structure of a chip card according to at least one particular embodiment of the invention.
Figure 4:
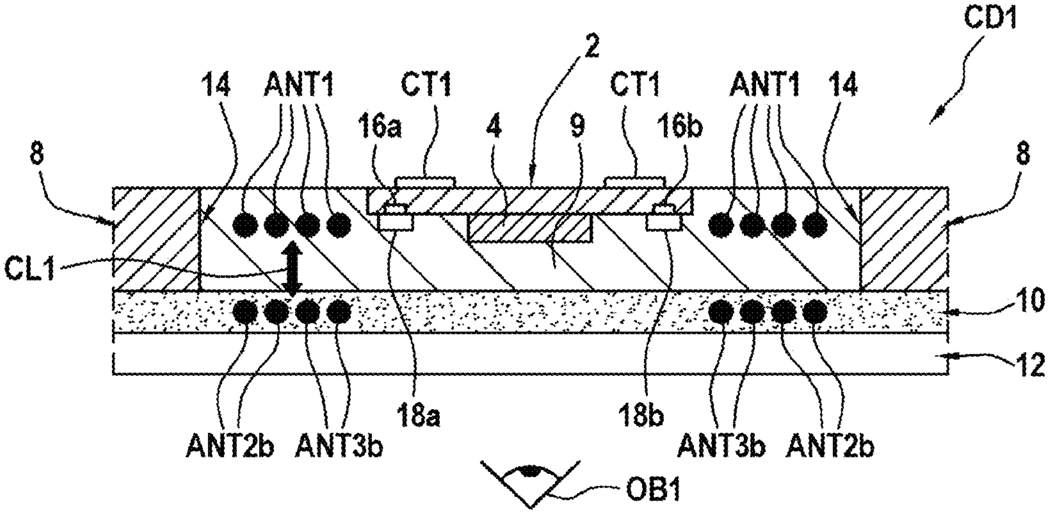
FIG. 4 is a detailed cross-sectional view of a segment of a chip card, according to at least one particular embodiment of the invention.

In particular, FIG. 3 schematically shows an exploded cross-sectional view of the chip card CD1 and FIG. 4 schematically shows a detailed cross-sectional view of the chip card CD1, according to at least one particular embodiment.

As shown in FIG. 3, the RF chip 4 is considered to be contained (or embedded) in an electronic module 2, the latter being inserted into the card body 6. The electronic module 2 is for example positioned in a cavity 5 formed in the upper face of the card body 6. To do this, the cut-out zone 14 contains an electrically insulating material 9 in which the cavity 5 used to accommodate the electronic module 2 is formed. Thus, the RF chip 4 is positioned in the cut-out zone 14 (or, as a variant, facing and above the cut-out zone 14). It should be noted, however, that various arrangements of the RF chip 4 are possible. Variants in which the RF chip 4 is not placed in, or facing, the cut-out zone 14 are in particular possible.

According to one variant embodiment, the RF chip 4 (with or without the electronic module 2) is positioned on (or facing) the metal layer 8. To this end, an insulating material may be placed between the RF chip 4 and the metal layer to provide electrical insulation.

In the example of FIG. 3, the electronic module 2 comprises, on its upper face, external contacts (or contact lands) CT1 configured to allow contact-based communication between the RF chip 4 and an external NFC reader provided to this end (with the NFC reader for example). More particularly, the electronic module 2 may comprise a printed circuit board (PCB) comprising the external contacts CT1 on its upper face, and the RF chip 4 on its lower face. The external contacts CR1 are metal zones designed to receive connection pins of an external NFC reader. These external contacts CT1 may be compliant with the standard ISO 7816, although other examples are possible. The electronic module 2 is placed in the chip card CD1 so that its external contacts CT1 are accessible from the upper surface of the card body 6, to allow the RF chip 4 to communicate by contact with an external NFC reader.

As already indicated, embodiments are also possible without such external contacts CT1. In addition, it is not obligatory for the RF chip 4 to be integrated into the electronic module 2 as shown in the figures, other arrangements of the RF chip 4 without such a module being possible.

In the example of FIG. 3, the RF chip 4 is placed in the cut-out zone 14. According to one variant, the first RF antenna ANT1 is placed outside the cut-out zone 14, namely facing the cut-out zone 14 (in alignment with and above the latter). The cut-out zone 14 thus lies in between the first RF antenna ANT1, on the one hand, and the second and third RF antennas ANT2 and ANT3, on the other hand, so as to allow coupling CL1 by magnetic induction between said first antenna ANT1 and at least one of said second and third antennas ANT2, ANT3.

The RF chip 4, and more generally the electronic module 2, may be arranged in the insulating layer 9 (commonly called the inlay). This configuration makes it easier to mount the RF chip 4 and the first RF antenna ANT1 in the card body 6.

As shown in FIG. 4, the card body 6 comprises at least one external insulating layer 12 formed on the lower face 10*b* of the insulating layer 10 so as to cover and protect the second and third RF antennas ANT2, ANT3. At least one protective insulating layer may also be provided, if necessary, on the upper face of the card body.

Each of the RF antennas ANT1, ANT2, ANT3 comprises at least one electrically conductive turn so as to allow exchanges of RF signals between the chip card CD1 and the outside world. The RF antennas ANT1, ANT2 and ANT3 may each consist for example of an electrically conductive track, wire or member forming one or more conductive turns. In the present case, the first, second and third RF antennas ANT1, ANT2, ANT3 are considered to each comprise a plurality of conductive turns. Various manufacturing techniques (deposition, etching, wire winding) well known per se may be used to produce these RF antennas. The physical characteristics (shape/size of the intersection, length of the antenna, number of turns, material, etc.) of the RF antennas ANT1, ANT2 and ANT3 may be set on a case-by-case basis in particular to allow wireless communication at the desired frequencies (or in the desired frequency ranges).

More precisely, as shown in FIG. 3, the first RF antenna ANT1 comprises a plurality of electrically conductive turns-called "first" conductive turns-placed in the cut-out zone 14. In this particular case, the size of the RF antenna ANT1 is therefore limited insofar as its first conductive turns are contained in the cut-out zone.

Moreover, the second RF antenna ANT2 and the third RF antenna ANT3 are electrically insulated from the metal layer 8 and from the first RF antenna ANT1. The second and third RF antennas ANT2, ANT3 are electrically insulated from one another.

This insulation may be achieved in various ways. For example, if the second and third antennas ANT2, ANT3 are produced by etching, an insulating layer (solder mask) may be placed between the second and third antenna ANT2, ANT3 and the metal layer 8 in order to prevent short-circuiting and oxidation of the second antenna. According to another example, the second and third antennas ANT2, ANT3 may each consist of a conductive wire surrounded by an insulating plastic sheath.

By way of example, the card body 6 is considered to comprise an electrically insulating layer 10 (commonly called an "inlay" which stands for "inner layer") interposed between the second RF antenna ANT2, on the one hand, and the metal layer 8 and the cut-out zone 14, on the other hand. The insulating layer 10 is in particular located at the interface between the second antenna ANT2 and the insulating material 9 in which the first RF antenna ANT1 extends.

Figure 9:
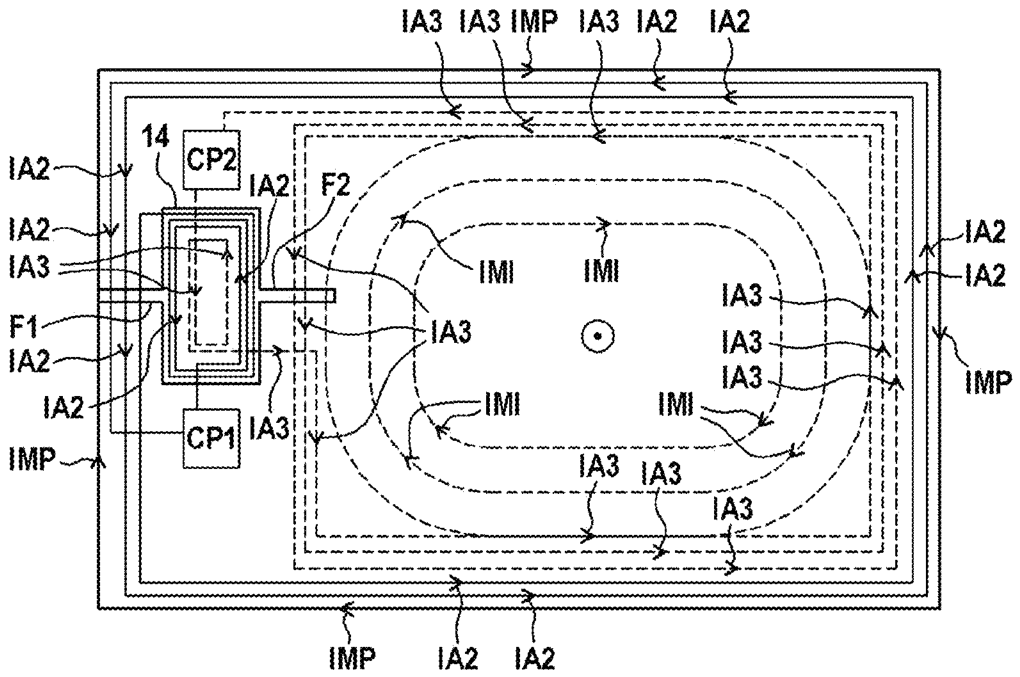
FIG. 9 illustrates the flow of eddy currents and the flow of image currents on the chip card in one particular implementation of the invention.

FIG. 9 illustrates the flow of the various currents through the card in one exemplary embodiment:

- IMP represents a peripheral eddy current a main loop of which flows around the periphery of the card when said card is centred with the reader;
- IA2 is an image current induced by this peripheral eddy current and flowing in the second antenna ANT2. It is routed up to the cut-out zone 14;
- IMI represents an internal eddy current a main loop of which flows in the second region of the card when said card is off-centre with respect to the reader;
- IA3 is an image current induced by this internal eddy current and flowing in the third antenna ANT3. It is routed up to the cut-out zone 14.

IA2 and IA3 flow in the same direction.

Figure 10:
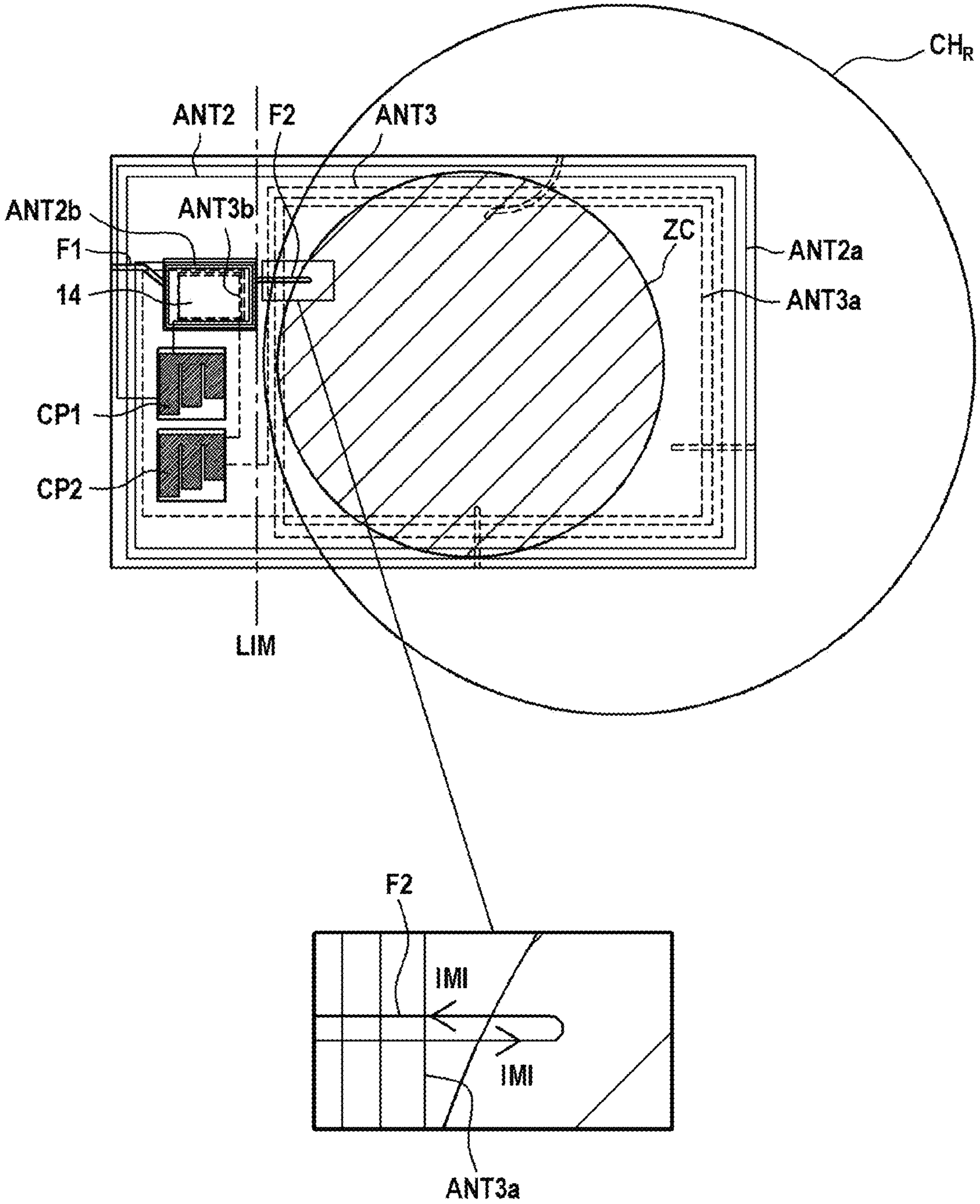
FIG. 10 shows one example of arrangement of an antenna and of a metal layer able to be implemented in a chip card according to one particular embodiment of the invention.

As illustrated in FIG. 10 in particular, the second RF antenna ANT2 is considered to comprise two antenna portions, namely a first antenna portion ANT2*a* and a second antenna portion ANT2*b* that are electrically connected to one another.

Similarly, the third RF antenna ANT3 comprises two antenna portions, namely a first antenna portion ANT3*a* and a second antenna portion ANT3*b* that are electrically connected to one another.

More precisely, the first portions ANT2*a* and ANT3*a* of the second and third RF antennas ANT2, ANT3 comprise a plurality of electrically conductive turns, which extend facing (or opposite) the metal layer 8, so as to collect an image current induced by eddy currents flowing through the metal layer 8 when the latter is subjected to an incident magnetic field.

More precisely, and as explained in detail below:

(i) the first portion ANT2*a* of the second antenna ANT2 is arranged so as to efficiently collect eddy currents flowing through the metal layer when the chip card CD1 is centred with respect to the antenna of the NFC reader;

(ii) the first portion ANT3*a* of the third antenna ANT3 is arranged so as to efficiently collect eddy currents flowing through the metal layer when the chip card CD1 is in an off-centre position with respect to the antenna of the NFC reader.

In this document, the card will be considered to be centred with respect to the antenna of the NFC reader when the entire surface of the card is exposed to a magnetic field generated by the antenna of the NFC reader that is uniform and of maximum strength on the surface of the card.

In the embodiment of FIG. 3, in the cut-out zone 14, the turns ANT2*b* of the second antenna ANT2 surround the turns ANT3*b* of the third antenna ANT3. As a variant, the turns ANT3*b* of the third antenna ANT3 surround the turns ANT2*b* of the second antenna ANT2. As a variant, the turns ANT2*b* and ANT3*b* are not in the same plane.

As shown in FIG. 4, in at least one embodiment, the RF chip 4 is electrically connected to the first RF antenna ANT1. In the example considered here, the electrical connection is made via connection pads (or lands) 16*a* and 16*b* of the electronic module 2, these pads being connected to connection pads (or lands) 18*a* and 18*b* provided to this end in the cut-out zone 14 (in the insulating material 9 in this example), respectively. The connection pads 18*a* and 18*b* are in turn connected to the two ends of the first RF antenna ANT1, respectively. However, other ways of connecting the RF chip 4 to the first RF antenna ANT1 are conceivable.

Various configurations of the second and third RF antennas ANT2, ANT3 are possible. According to one preferred embodiment, the second portion ANT2*b* of the second antenna ANT2 and the second portion ANT3*b* of the third antenna ANT3 extend exclusively facing the cut-out zone 14. In other words, these antenna portions ANT2*b*, ANT3*b*, which are formed from a plurality of conductive turns, are placed facing the cut-out zone 14 so that they do not extend facing the metal layer 8. In particular, these antenna portions ANT2*b*, ANT3*b* are not superposed with (or do not cover) the metal layer 8 on the periphery of the cut-out zone 14, this allowing the flux of the magnetic field to which these second antenna portions ANT2*b*, ANT3*b* and the first RF antenna ANT1 are subjected to be optimized. Although it is not desirable for a segment of the second portion ANT2*b*, ANT3*b* of the second antenna ANT2 or of the third antenna ANT3 to extend facing the metal layer 8, a certain tolerance may be accepted in certain cases.

Figure 5:
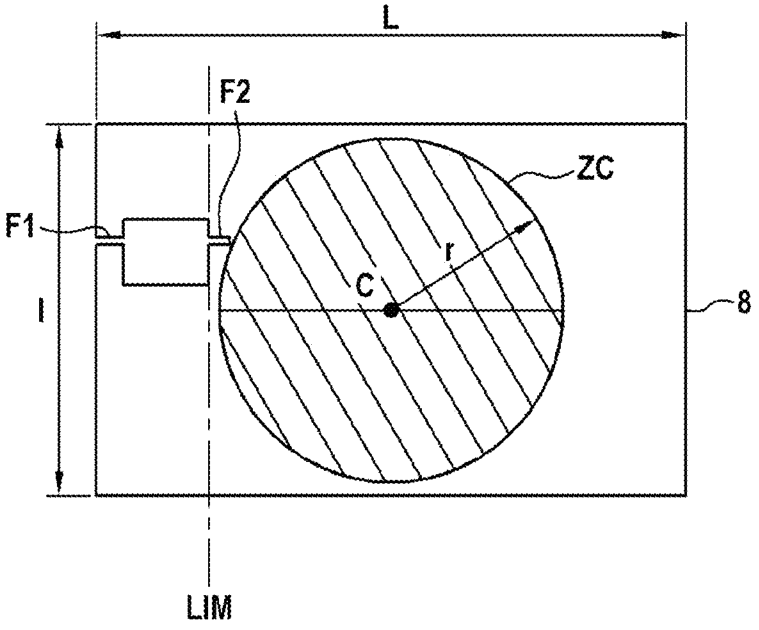
FIG. 5 illustrates a zone of exploitability of eddy currents in a metal layer.

The hatching in FIG. 5 illustrates, for one particular embodiment of the invention, a special zone ZC for exploitation of the eddy currents that flow through the metal layer 8 when the chip card is exposed to a magnetic field under defined conditions, this special zone ZC being contained in the region R2 of the metal layer 8.

Figure 16:
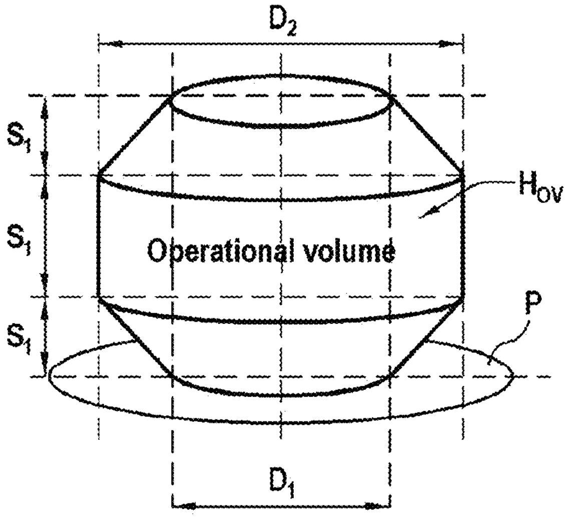
FIG. 16, which has already been described, shows the operating conditions of a chip card as defined by the international organization EMVCo.
Figure 16:
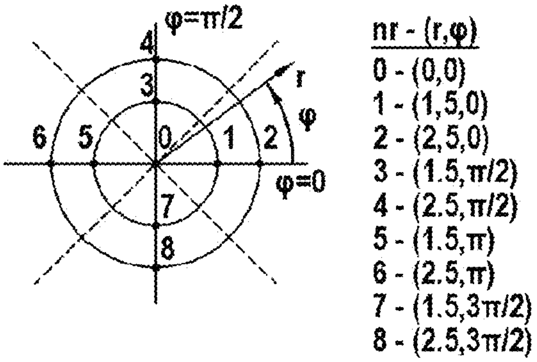

This FIG. 5 is given, merely by way of illustration, in the particular context of the operating conditions defined by the international organization EMVCo and recalled above with reference to FIG. 16.

As is known, when a metal surface is subjected to a magnetic field, this magnetic field induces on this surface eddy currents that form closed loops, the dominant loops being such that they maximize the area of these loops opposite the maximum-strength magnetic field.

Thus, when a metal layer is subjected to a magnetic field that is uniform over the entire surface of the card, the dominant loop of the eddy currents induced by the incident magnetic field follows the outline of the card.

In contrast, assuming that the reader possesses a circular antenna and that it produces a uniform magnetic field, as soon as the metal surface is no longer entirely opposite a uniform field, the dominant loop no longer follows the outlines of the card, but maximizes the area of this loop in direct view of the maximum-strength magnetic field.

In other words, to a first approximation, the dominant loop bounds the projection of this field on the surface of the card.

In one embodiment of the invention, the special zone ZC for exploitation of eddy currents may be a zone of the surface of the card that is subjected to a uniform maximum-strength magnetic field whatever the operating conditions of the card.

For example, FIG. 5 shows a chip card in ID-1 format (length L of 85.6 mm and width I of 54.0 mm, C being the centre of the card and being considered below to be the centre of the metal layer 8) and a zone ZC of exploitability of eddy currents consisting of a disc having a centre C and a radius r of 2.5 cm.

The inventors have determined that whatever the position of the centre C of the card in the operational volume defined by the organization EMVCo, such a special zone of exploitability ZC (disc of 25 mm radius in the centre of the card) is completely contained in an electromagnetic field generated by the antenna of the NFC reader of sufficient strength for eddy currents flowing through this zone to be exploited by the invention.

Figure 6:
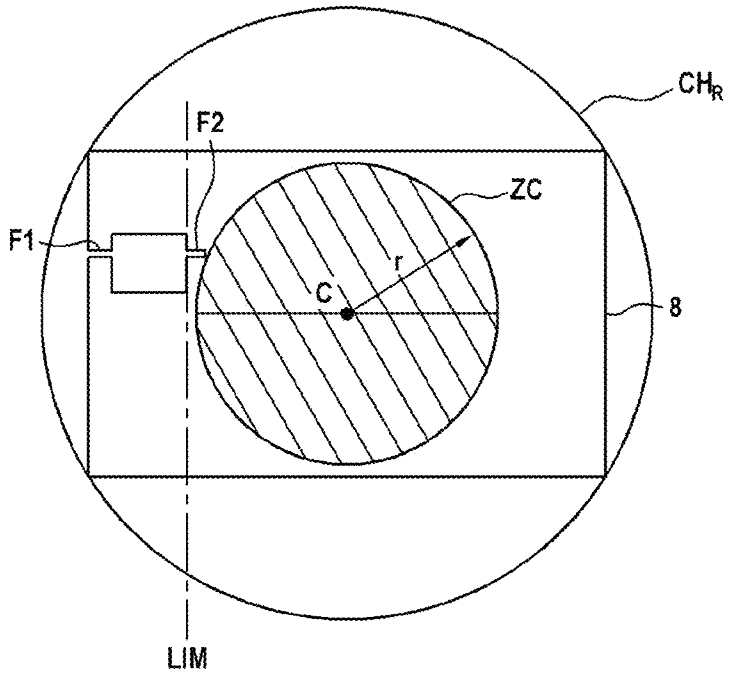
FIG. 6 shows a chip card centred with respect to the source of an incident magnetic field.

In FIG. 6, a circle CHR bounding a maximum-strength magnetic field generated by an NFC reader has been shown. This figure assumes an NFC reader antenna that is perfectly circular and rotationally symmetrical.

In this figure, the centre C of the chip card CD1 is located at the centre of the circle CHR.

Figure 7:
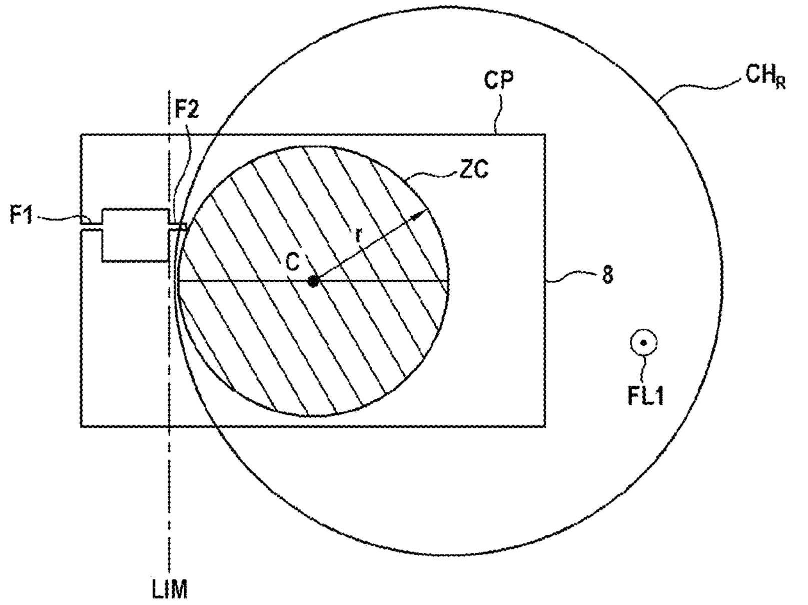
FIG. 7 shows a chip card off-centre with respect to the source of an incident magnetic field.

FIG. 7 shows the chip card CD1, the centre C of the chip card CP being offset by 25 mm with respect to the centre of the circle CHR, this offset of 25 mm corresponding to the maximum offset of the card in the operational volume defined by EMVCo (point 6 of FIG. 16).

The inventors have observed that the zone ZC of exploitability of eddy currents that is shown in FIG. 7 (disc of 25 mm radius centred on the card) is located entirely in the maximum-strength field CHR of the NFC reader, in particular for the maximum offset (point 6) of the card in the operational volume defined by EMVCo, and therefore for any position of the card under the defined operating conditions.

The invention may be used in contexts other than that of the EMVCo standard.

Generally, the zone ZC of exploitability of eddy currents that is used in the invention may be defined so that this zone ZC is located entirely in a maximum-strength magnetic field, whatever the position of the card under predefined operating conditions.

Figure 8A:
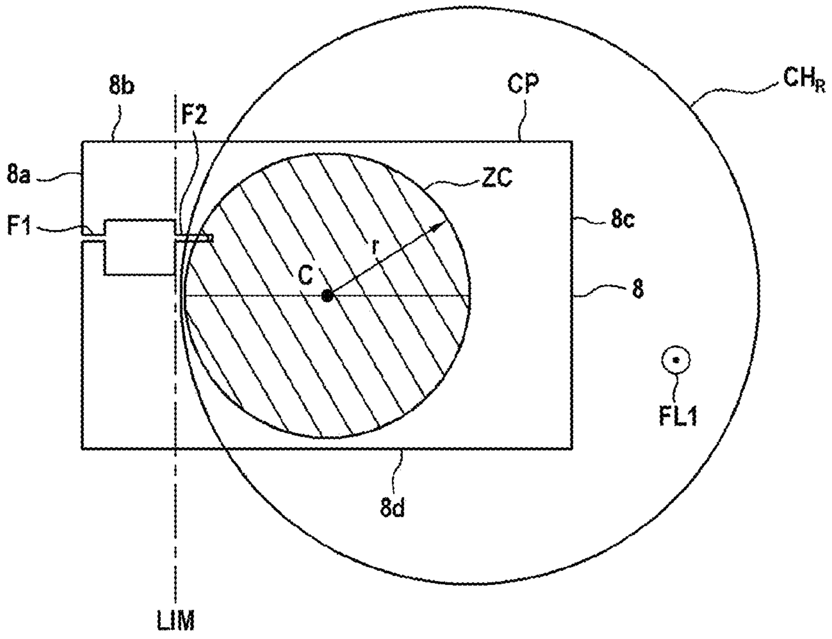
FIG. 8A shows a first example of a metal layer able to be used in particular implementations of the invention.
Figure 8B:
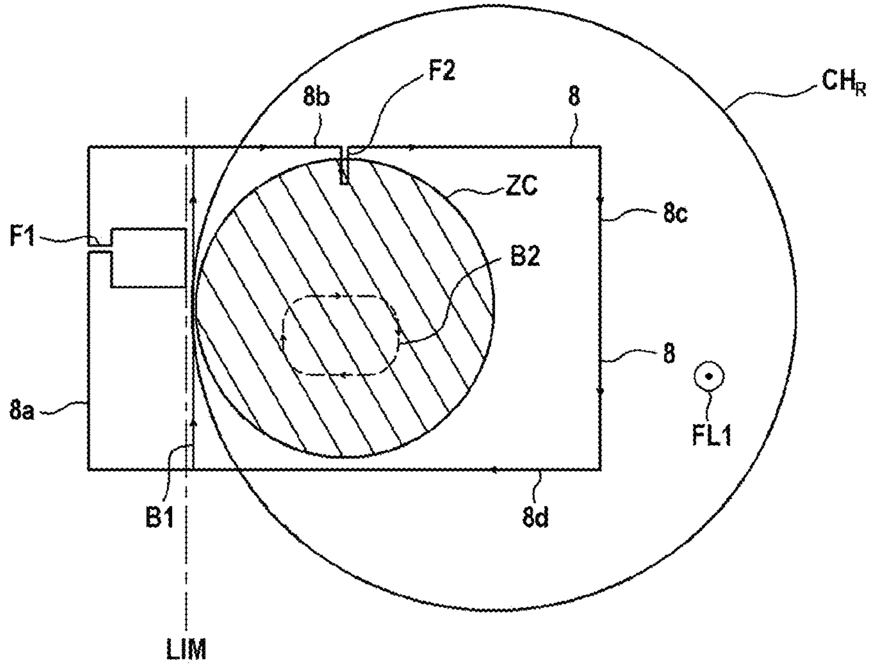
FIG. 8B shows a second example of a metal layer able to be used in particular implementations of the invention.
Figure 8C:
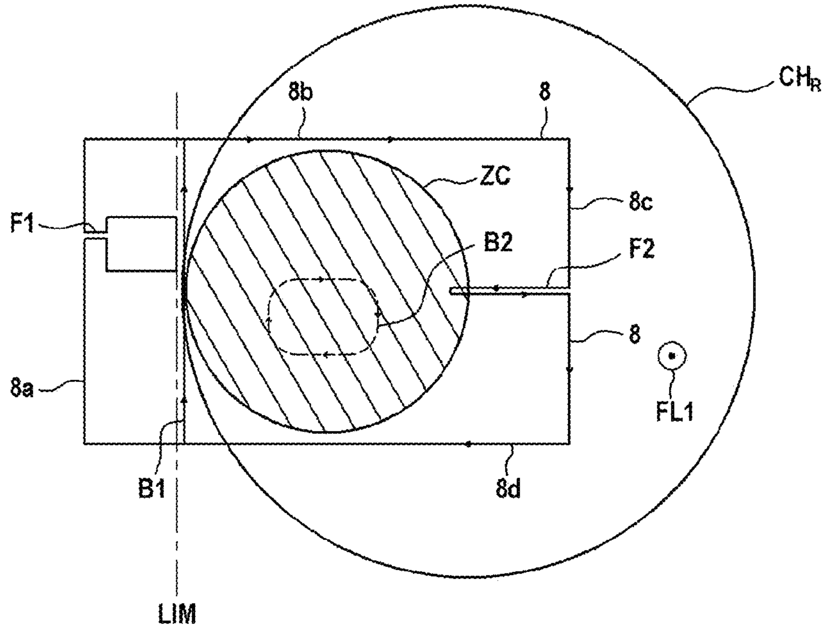
FIG. 8C shows a third example of a metal layer able to be used in particular implementations of the invention.

FIGS. 8A to 8D show four examples of a metal layer 8 comprising:

(i) a cut-out zone 14 connected by a first slit F1 to the edge 8*a* corresponding to the short side of the metal layer 8 closest to the cut-out zone; and (ii) a slit F2, noteworthy in that it opens either onto one edge of the metal layer 8 or into the cut-out zone 14 and in that it has a closed end located in the second region R2 of the metal layer, and in the examples of FIGS. 8A to 8C more precisely in a special zone ZC of exploitability of eddy currents.

In these FIGS. 8A to 8D, the symbol FL1 shows the direction of the magnetic field of the NFC reader. This magnetic field generates eddy-current loops on the metal layer 8.

Figure 8D:
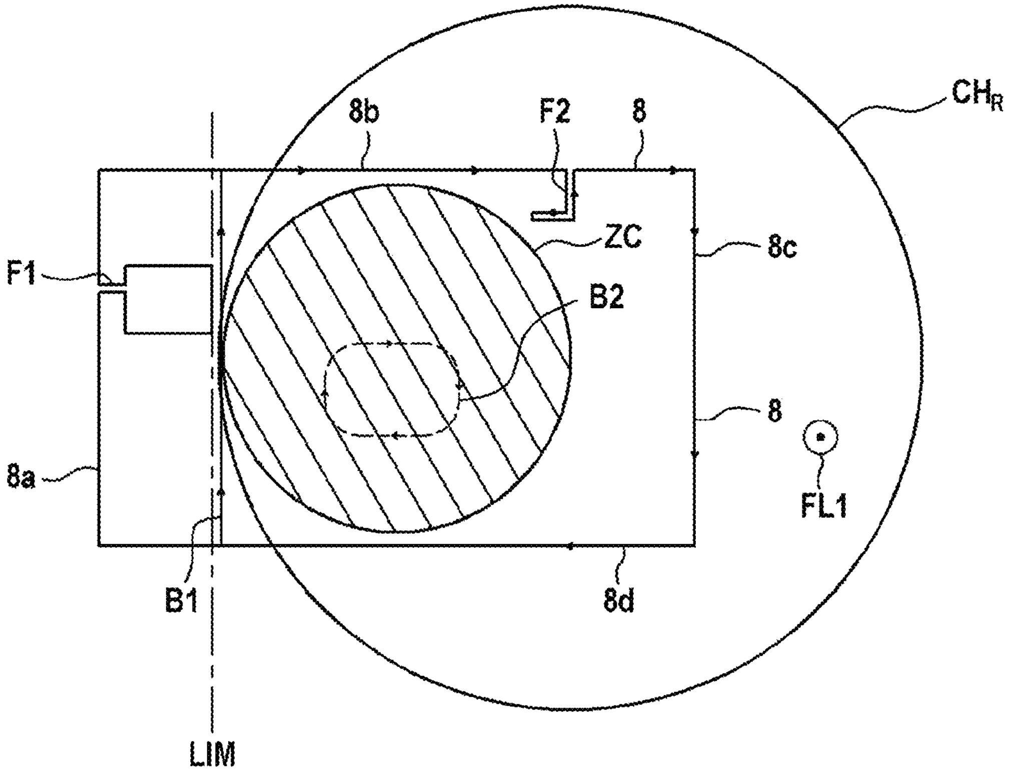
FIG. 8D shows a fourth example of a metal layer able to be used in particular implementations of the invention.

For the sake of simplicity, in FIGS. 8B to 8D corresponding to the off-centre use of the card, only two loops B1, B2 of the internal eddy current IMI from FIG. 9 have been shown, including one dominant loop B1.

Eddy currents form in closed loops over the entire metal surface having an incident magnetic field of the reader. The direction of the eddy currents in these loops is in phase opposition with respect to the magnetic field that created them, that is to say clockwise for the example of the incident magnetic field in FIG. 9.

In the four examples, the slits F1 and F2 are thus arranged to let the magnetic field generated by a chip card reader pass through and to pass an eddy current flowing through the metal layer 8.

These slits F2 make it possible to orient the eddy currents so that the latter are in phase with the magnetic flux delivered by the terminal around the slit, and hence the eddy currents around the slit do not counteract this magnetic flux.

Since the turns of the antennas ANT2 and ANT3 are all in planes parallel to that of the metal layer carrying the eddy current loops, a conduction current will be induced by the image effect in these conductive wires forming the turns of the antenna, and therefore in phase opposition with respect to the eddy currents to which they exhibit the image effect. These image currents induced in the various turns of ANT2 and ANT3 are therefore in phase with the magnetic field of the NFC reader.

FIG. 10 shows, in addition to the metal layer 8, two antennas ANT2, ANT3 (second and third antennas in the context of the invention) implemented on a plastic layer (not shown).

The second antenna ANT2 (respectively the third antenna ANT3) comprises a first portion ANT2*a* (respectively ANT3*a*) and a second portion ANT2*b* (respectively ANT3*b*).

The second antenna ANT2 and the third antenna ANT3 are configured so that the current flows in the same direction in the first and second portions ANT2*a*, ANT3*a* and ANT2*b*, ANT3*b* of the second and third antennas ANT2, ANT3.

In the embodiment of FIG. 10, the first portion ANT2*a* of the second antenna ANT2 is the most peripheral portion. It is arranged facing the metal layer 8 and extends along the four edges of the metal layer 8. It comprises at least one turn straddling the first slit F1.

In the embodiment of FIG. 10, the first portion ANT3*a* of the third antenna ANT3 is noteworthy in that it is arranged facing the second region R2 of the metal layer 8 and that it has at least one turn facing the second slit F2.

Thus, at least one turn of the third antenna ANT3 is able to pick up an image current induced by a current flowing in a main loop of an eddy current generated by an incident magnetic field under the operating conditions of the chip card, when this loop is located in the second region R2.

In the embodiment of FIG. 10, the second portion ANT2*b*, ANT3*b* of each of the second and third antennas ANT2, ANT3 is not superposed with the metal layer 8, but is superposed with at least a portion of the cut-out zone 14.

Figure 11:
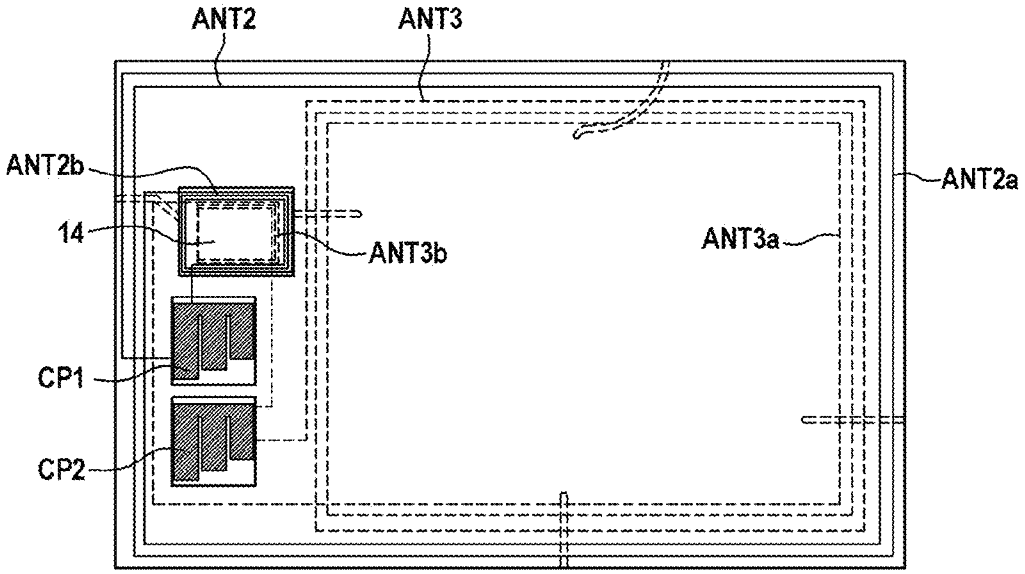
FIG. 11 shows a chip card according to one particular embodiment of the invention.

FIG. 11 shows a chip card CD1 according to one embodiment of the invention. It in particular comprises a first antenna ANT1 electrically connected to an RF chip, a second antenna ANT2, a third antenna ANT3 and a metal layer 8.

The metal layer 8 comprises a cut-out zone 14 or cavity the size of which is at least equal to the size of the dielectric substrate accommodating the first antenna ANT1, the first antenna ANT1 being placed in or facing the cut-out zone, in such a way that the first antenna ANT1 does not straddle the metal layer 8.

In the embodiment of FIG. 11, the first antenna ANT1 is provided on the substrate bearing a contact plate. As a variant, the first antenna ANT1 may be carried by another dielectric substrate placed in the cut-out zone 14 and connected to the contact-plate module, bearing the RF chip, by a connection ACF.

In the embodiment of FIG. 11, the cut-out zone 14 opens onto a peripheral edge 8*a* of the metal layer. To this end, the cut-out zone is connected to the peripheral edge 8*a* of the metal layer by a first slit F1 that extends from the cut-out zone to the edge 8*a* of the metal layer 8. In the embodiment of FIG. 11, a second slit F2 extends from the cut-out zone 14 towards the interior (or central zone) of the metal layer. This second slit is closed and its end is located in the second region R2.

In the embodiment described here, the second and third antennas ANT2, ANT3 are electrically insulated from the metal layer 8 by way of a dielectric insulating layer.

As illustrated in FIG. 10, the first portion ANT2*a* of the second antenna ANT2 is the most peripheral portion. It is arranged facing the metal layer 8 and extends along the four edges of the metal layer 8. It straddles the slit F1.

As illustrated in FIG. 10, the first portion ANT3*a* of the third antenna ANT3 is arranged facing the metal layer 8 and at least one turn straddles the slit F2 in the second region R2.

As illustrated in FIG. 10, the second portion ANT2*b* (respectively ANT3*b*) of the second antenna ANT2 (respectively of the third antenna ANT3) terminates the second antenna ANT2 (respectively the third antenna ANT3). It is not superposed with the metal layer 8 but is superposed with at least a portion of the cut-out zone 14.

As described in detail below, the second portion ANT2*b* of the second antenna ANT2 and/or the second portion ANT3*b* of the third antenna ANT3 provide inductive coupling between the second and/or the third antenna ANT2, ANT3 and the first antenna ANT1 depending on the operating conditions.

In the embodiment described here, the card CD1 comprises a capacitive element CP1 connected in parallel to the second antenna ANT2 and a capacitive element CP2 connected in parallel to the third antenna ANT3. In the embodiment described here, the capacitive elements CP1, CP2 are parallel-plate capacitors. Other implementations may be used. The capacitive element CP1 and/or the capacitive element CP2 may be implemented as a discrete capacitive component.

In the example described here, the capacitive components CP1, CP2 are placed in the insulating layer 10 or on the lower face 10*b* of this insulating layer 10. Once the magnetic coupling CL1 has been achieved, the RF antennas ANT1 and ANT2 (respectively ANT1 and ANT3) are connected in parallel with the capacitive component CP1 (respectively CP2). The capacitive component CP1 (respectively CP2) thus forms, with the RF antennas ANT1 and ANT2 (respectively ANT1 and ANT3), an RLC circuit allowing the resonant frequency of the second RF antenna ANT2 (respectively of the third antenna ANT3) to be tuned so that it is for example equal to 13.56 MHZ, this allowing a communication C1 in contactless mode of RFID type with an RFID reader (for example according to standard ISO14443/ISO 10373, in particular the current version ISO/IEC 10373-6: 2020 or any of the earlier versions, or any later version).

The capacitive component CP1 or CP2 may be of comb type and comprises two opposite sets of conductive fingers interdigitated with one another, other forms of capacitor however being possible (parallel-plate capacitor, discrete surface-mounted capacitor, parallel-wire capacitor, etc.).

For example, the first capacitive component CP1 (respectively the second capacitive component CP2) is connected to one end of the first portion ANT2*a* (respectively ANT3*a*) of the second antenna ANT2 (respectively of the third antenna ANT3) and to one end of the second portion ANT2*b* (respectively ANT3*b*) of the second antenna ANT2 (respectively of the third antenna ANT3).

In the embodiment of FIG. 11, the capacitive elements CP1 and CP2 connected in parallel respectively to the second antenna ANT2 and to the third antenna ANT3 are on the same side of the cut-out zone 14.

Figure 12:
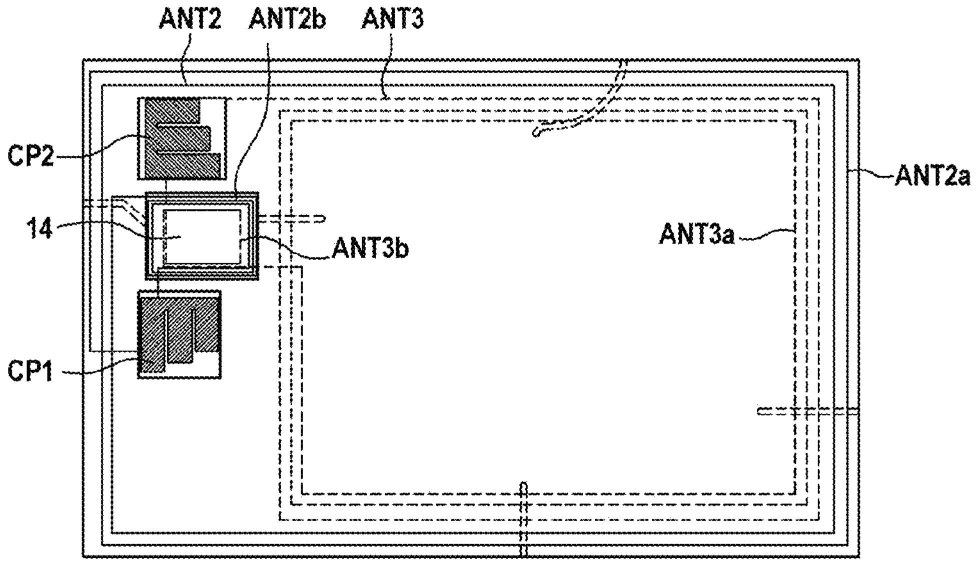
FIG. 12 shows a chip card according to another particular embodiment of the invention.

In the embodiment of FIG. 12, the capacitive elements CP1 and CP2 are on either side of the cut-out zone 14.

The examples of slits F2 shown in FIG. 8 are only non-limiting examples. Any slit opening either into the cavity 14 or onto one edge of the card and ending with a closed end in the second region R2, preferably in a special zone ZC of exploitability of eddy currents, may be used in the context of the invention.

Figure 13:
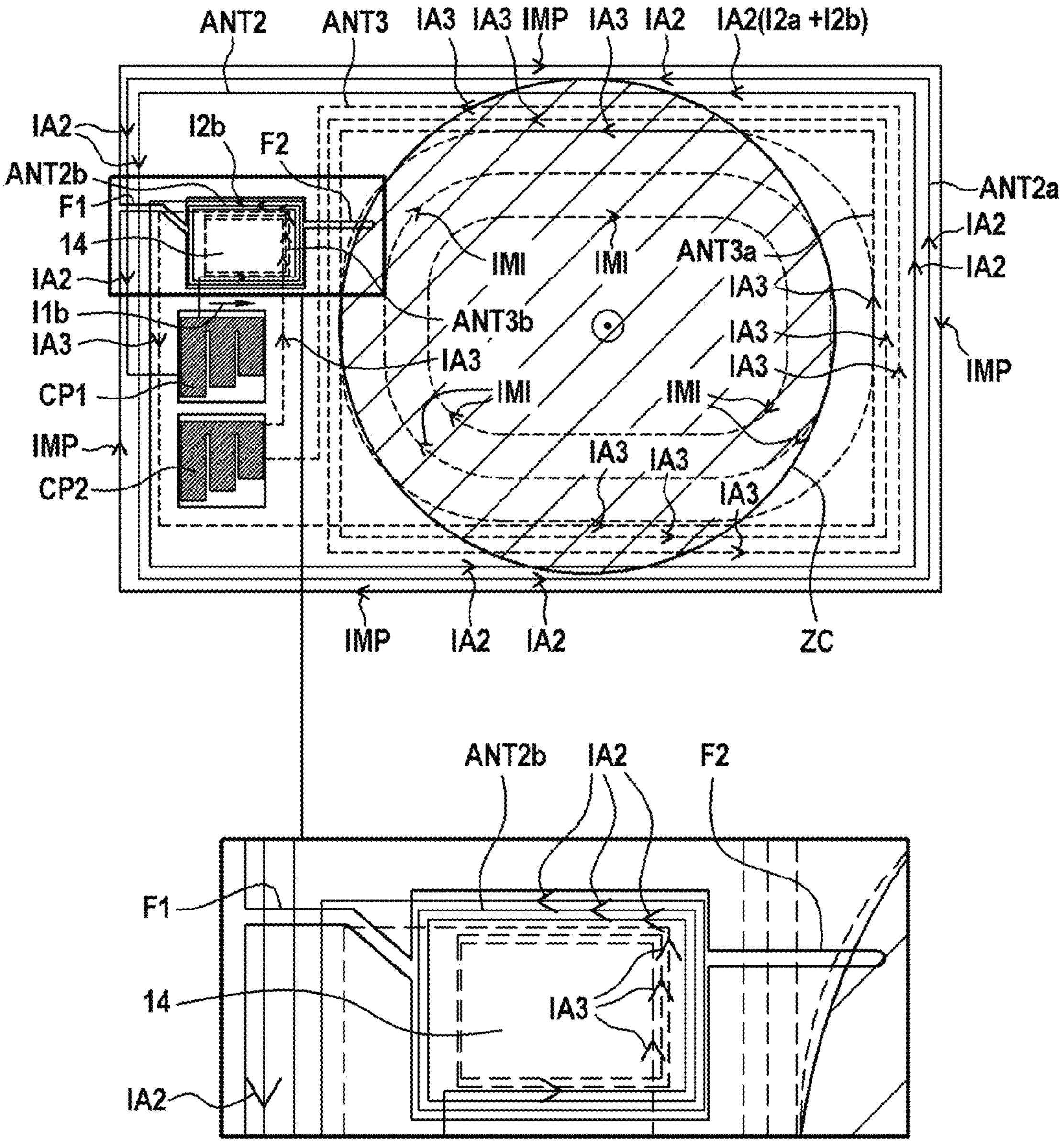
FIG. 13 illustrates operation of the chip card of FIG. 11.

FIG. 13 illustrates operation of the chip card of FIG. 12 when it is centred with respect to the antenna of the NFC reader, or in other words when the surface of the card is exposed to a uniform magnetic field FL1 generated by the reader.

Under the effect of the magnetic field FL1, eddy currents IMP (at the periphery) and/or IMI (internal) are generated in the metal layer 8 depending on the operating conditions of the card. These eddy currents flow in the form of closed current loops on the surface of the metal layer 8. These eddy currents form closed loops in the metal layer 8, in a direction such as to create a magnetic field that counteracts the incident magnetic field.

In the example of FIG. 13, the eddy currents flow clockwise.

Let it be assumed that the entire surface of the card is exposed to a uniform magnetic field and, as in the case illustrated in FIG. 13, that the dominant eddy current loop IMP follows the peripheral outline of the metal layer 8.

As known to those skilled in the art, the eddy currents, which flow in the clockwise direction, induce an image current I2*a* that flows through the first antenna portion ANT2 in the anti-clockwise direction.

As shown in FIG. 13, eddy currents—referred to as first eddy currents—corresponding to dominant loops flowing on the surface of the metal layer 8 in the vicinity of the peripheral outline of said metal layer 8, have been denoted IMP. Eddy currents—referred to as second eddy currents—corresponding to secondary loops flowing on the surface of the metal layer 8 in the vicinity of the peripheral outline of the cut-out zone 14, have been denoted I1*b*. Since the eddy currents flow in closed loops, the eddy currents I1*b* are actually a continuation of the eddy currents IMP in the vicinity of the peripheral outline of the cut-out zone 14. As may be seen in FIG. 13, the second eddy currents I1*b* flow, in the vicinity of the second antenna portion ANT2*b*, in a direction of rotation (or direction of flow) opposite to that of the first eddy currents IMP flowing in the vicinity of the peripheral outline of the metal layer 8. By way of example, the first and second eddy currents IMP, I1*b* are considered to flow in the clockwise and anti-clockwise directions, respectively, the inverse configuration however being possible depending on the orientation of the magnetic field FL1 in question. The oppositely directed flows of the eddy currents IMP and I1*b* in particular result from the aforementioned continuation of the eddy currents, and from the presence of the cut-out zone 14 which, in this example, is connected by the linking slit F1 to the peripheral outline 8*a* of the metal layer 8.

Therefore, the current IA2 flowing through the second RF antenna ANT2 is an induced current resulting from two components, namely: an image current I2*a* induced by the first eddy currents IMP flowing on the surface of the metal layer 8 in the vicinity of the first antenna portion ANT2*a*; and a current I2*b* that is induced directly in the second antenna portion ANT2*b* by the incident magnetic field FL1 through the cut-out zone 14 (IA2=I2*a*+I2*b*). The very structure of the chip card CD1 is designed to lead to this dual contribution of the induced currents I2*a* and I2*b*, in order to collect in the second RF antenna the highest possible overall induced current IA2.

More precisely, the first antenna portion ANT2*a* extending facing the metal layer 8 collects an image current I2*a* induced by the first eddy currents IMP flowing on the surface of the metal layer 8 under the effect of the magnetic field FL1 when the chip card CD1 is centred with the antenna of the NFC reader.

These first eddy currents IMP correspond to dominant loops flowing on the surface of the metal layer 8 in the vicinity of the turns of the first antenna portion ANT2*a*. As already indicated, the first portion of the second antenna ANT2*a* may preferably extend facing a peripheral zone (or strip) of the metal layer 8, so as to collect a maximum amount of energy generated by the dominant eddy current loops. The first eddy currents IMP flowing in the vicinity of the first portion ANT2*a* of the second antenna ANT2 (in this example on the periphery of the metal layer 8) produce an effect that counteracts the incident magnetic field FL1. The induced current I2*a* collected in the turns of the first antenna portion ANT2*a* is itself a reaction to the first eddy currents.

The image current I2*a* induced by the first eddy currents IMP is conveyed by electrical conduction to the second portion ANT2*b* of the second antenna ANT2, because of the electrical continuity between the first and second antenna portions ANT2*a*, ANT2*b*, which are connected together.

As illustrated in FIG. 13, the image current IA2 flows in the same direction of rotation (or the same direction of flow) through the turns of the first and second antenna portions ANT2*a*, ANT2*b*, namely in the anti-clockwise direction in this example. However, because of the presence in the metal layer 8 of the cut-out zone 14 connected via the linking slit F1 to the peripheral edge 8*a*, the second eddy currents I1*b* (secondary loops) flow in the vicinity of the cut-out zone 14, on the surface of the metal layer 8, in a direction of rotation (or direction of flow) opposite that of the first eddy currents IMP flowing on the periphery of the metal layer 8. By way of example, the second eddy currents I1*b* here flow in the anti-clockwise direction whereas the first eddy currents IMP flow in the clockwise direction. Thus, the second eddy currents I1*b* flowing on the periphery of the cut-out zone 14 do not counteract the magnetic field passing through the slit and contribute to amplifying the image current flowing through the turns of the third antenna portion ANT2*c*.

Moreover, the effect of the second slit F2 is to push the dominant eddy current loop towards the first portion ANT3*a* of the third antenna ANT3, this increasing the coupling of energy between the eddy currents of the metal layer 8 and the third antenna in the vicinity of the second slit F2.

As already indicated, the second antenna portion ANT2*b* furthermore collects, in its turns, a current I2*b* that is induced directly by the incident magnetic field FL1 picked up in the cut-out zone 14 by the second antenna portion ANT2*c*. In this example, the magnetic field FL1 is directed from the upper face of the chip card CD1 to its lower face. Thus, the current component I2*b* induced in the second antenna portion ANT2*b* also flows in the anti-clockwise direction and therefore adds constructively with the image current I2*a*. Since the two current components I2*a* and I2*b* flow in the same direction (in-phase components) in the second antenna ANT2, they add constructively to contribute together to generation of the overall induced current IA2 flowing through the second antenna ANT2.

The overall current I2A flowing through the second antenna portion ANT2*b* in turn induces a magnetic field that causes magnetic coupling CL1 between the first RF antenna ANT1 and the second RF antenna portion ANT2*b*, and therefore all the more between the first RF antenna ANT1 and the second RF antenna ANT2. The combined action of the image current I2*a* delivered by the first antenna portion ANT2*a*, on the one hand, and of the current I2*b* induced by the magnetic field FL1 in the cut-out zone 14 in the third antenna portion ANT2*c*, on the other hand, allows the amount of energy collected in the second RF antenna ANT2 from the magnetic field FL1 to be maximized, and therefore effective magnetic coupling CL1 between the two RF antennas ANT1, ANT2 to be guaranteed, this making it possible to deliver a maximum amount of energy to the RF chip 4 connected to the first RF antenna ANT1.

The second antenna portion ANT2*b* thus contributes to amplifying the energy harvested because it also comprises an electric-current component induced directly by the incident magnetic field of the NFC reader. The fact that the current flows in the same direction through the two portions of the antenna ANT2 increases the transfer of energy (energy harvested simultaneously from the eddy currents on the surface of the metal layer 8 combined with the harvested energy directly induced by the incident magnetic flux through the cavity zone 14) by coupling to the first antenna ANT1 and therefore to the RF chip 4.

In an absolutely equivalent manner, the second portion ANT3*b* of the third antenna ANT3 also contributes to amplifying the energy harvested because it also comprises, in the same way, an electric-current component induced directly by the incident magnetic field of the NFC reader. The fact that the current flows in the same direction through the two portions of the antenna ANT3 increases the transfer of energy (energy harvested simultaneously from the internal eddy currents IMI on the surface of the metal layer 8 combined with the harvested energy directly induced by the incident magnetic flux through the cavity zone 14) by coupling to the first antenna ANT1 and therefore to the RF chip 4.

Returning to FIG. 8A for example, when the card CD1 is off-centre with respect to the NFC reader, the dominant loop B1 of the eddy currents IMI flows through the second region R2 clockwise in a closed loop along the edges 8*b*, 8*c*, 8*d* of the metal layer 8, this loop traversing the metal layer from the edge 8*d* to the edge 8*b* on a path that maximizes the area of this loop in direct view of the maximum-strength magnetic field.

As shown with reference to FIG. 10, the first portion ANT3*a* of the third antenna ANT3 is arranged so that at least one of its turns straddles the slit F2 in the second region R2, and preferably in a special zone ZC of exploitability of eddy currents ZC.

The antenna ANT3 is thus able to pick up an image current induced by a current flowing in the dominant loop B1 of the eddy current induced by the magnetic field when the card is off-centre, the dominant loop B1 being diverted by the slit F2, facing at least one turn of the portion ANT3*a*.

In operation, under the effect of the magnetic field FL1 to which the chip card CD1 is subjected, the RF chip 4 is thus capable of using the second RF antenna ANT2 and/or the third antenna ANT3, either or both of these antennas ANT2, ANT3 being able to be coupled to the first RF antenna ANT1 to communicate with the external NFC reader (in particular to transmit RF signals to and/or receive RF signals from the NFC reader) whatever the position of the card with respect to the NFC reader under defined operating conditions.

When a user presents the chip card CD1 in the vicinity of the NFC reader, a contactless communication may thus be set up between the NFC reader and the chip card CD1, whatever the position and orientation of the latter with respect to the NFC reader, the current induced by the dominant loops of the eddy currents being collected either by the second antenna ANT2 or by the third antenna ANT3 depending on whether the card is centred or off-centre with respect to the reader, within the limits of the operating conditions of the card.

As already indicated, various arrangements of the chip card CD1 may be envisaged, in particular as regards the configuration in respect of shape, dimensions, position, etc. of the cut-out zone 14 and of the slits F1 and F2.

Figure 14:
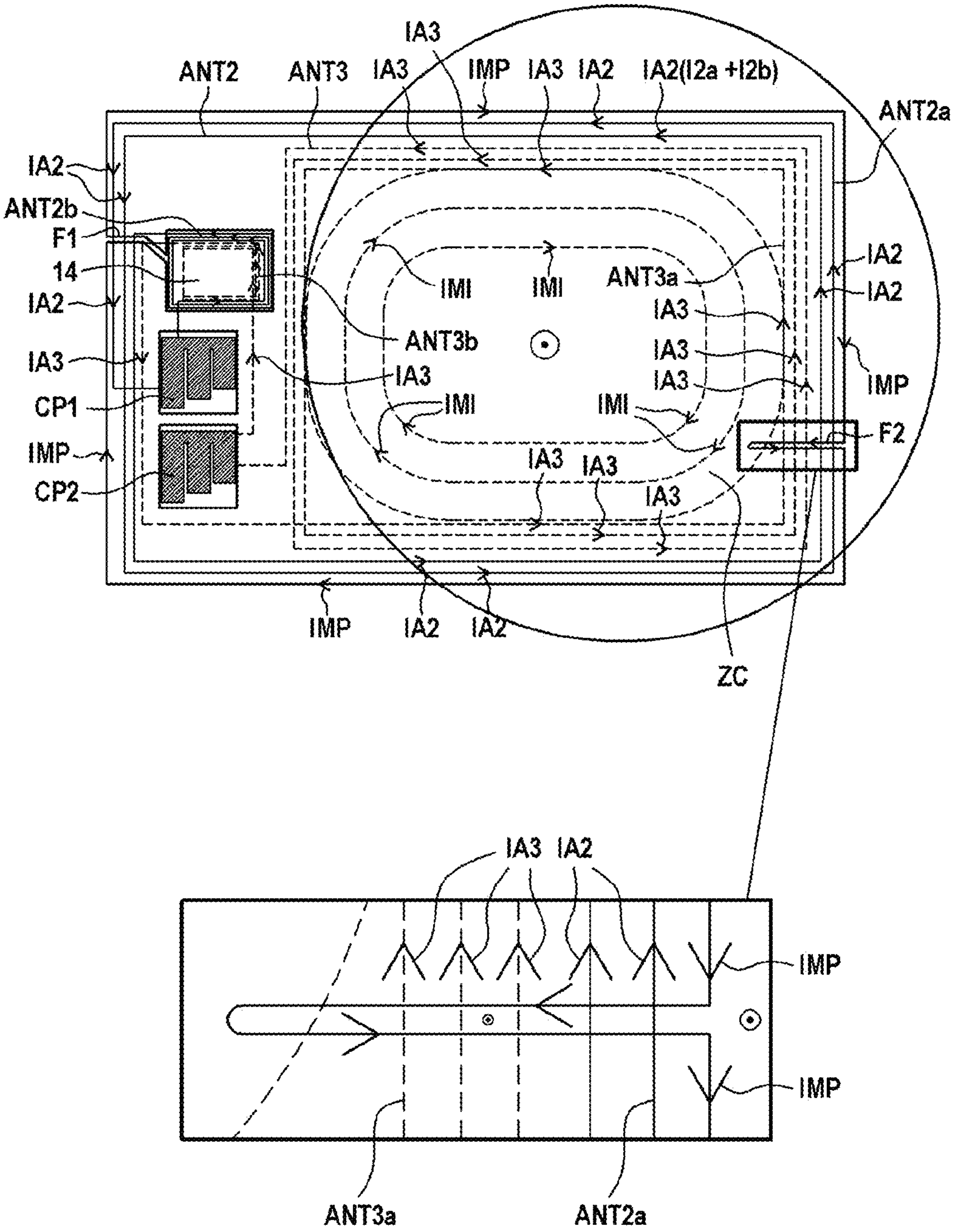
FIG. 14 shows another chip card according to one particular embodiment of the invention.

FIG. 14 illustrates another chip card according to the invention. In this embodiment, the second slit F2 opens onto an edge opposite the edge 8*a* onto which the first slit F1 opens.

As detailed above, the circle CHR represents the outline bounding the region/zone of maximum strength of the magnetic field of the NFC reader, in the plane of the card, in which region/zone the field may be considered to be approximately uniform.

FIG. 14 illustrates a situation in which the NFC card is placed offset from the centre of the circle CHR, so that the cut-out zone 14 and the second antenna portions ANT2*b* and ANT3*b* are outside this region of maximum magnetic field.

The slit F2 opens onto one edge of the card and ends with a closed portion in the second region R2 of the metal layer.

This slit F2 is thus arranged to divert the dominant loops of the eddy current towards the zone ZC of exploitation of the eddy currents, facing which zone at least one turn of the first portion ANT3*a* of the third antenna ANT3 extends.

In the embodiment described here, the depth of the slit F2 along the longitudinal dimension of the chip card is chosen to be at least equal to or close to the distance of the adjacent turns of the first portion ANT3*a* of the antenna ANT3 from the edge of the metal layer onto which the slit F2 opens.

Moreover, and as shown in the detail of FIG. 14, the slit F2 also allows the incident magnetic field of the reader to pass through the metal layer 8 while being in phase with the electric current induced in the turns of the antenna portion ANT3*a*. As explained above, the current in the third antenna ANT3 has the following components:

(i) a first component corresponding to the image current picked up by the third antenna ANT3*a*; and (ii) a second component created by magnetic induction through the aperture of the slit F2 in the portion of the antenna wires of the third antenna ANT3 that straddles the slit F2.

Figure 15:
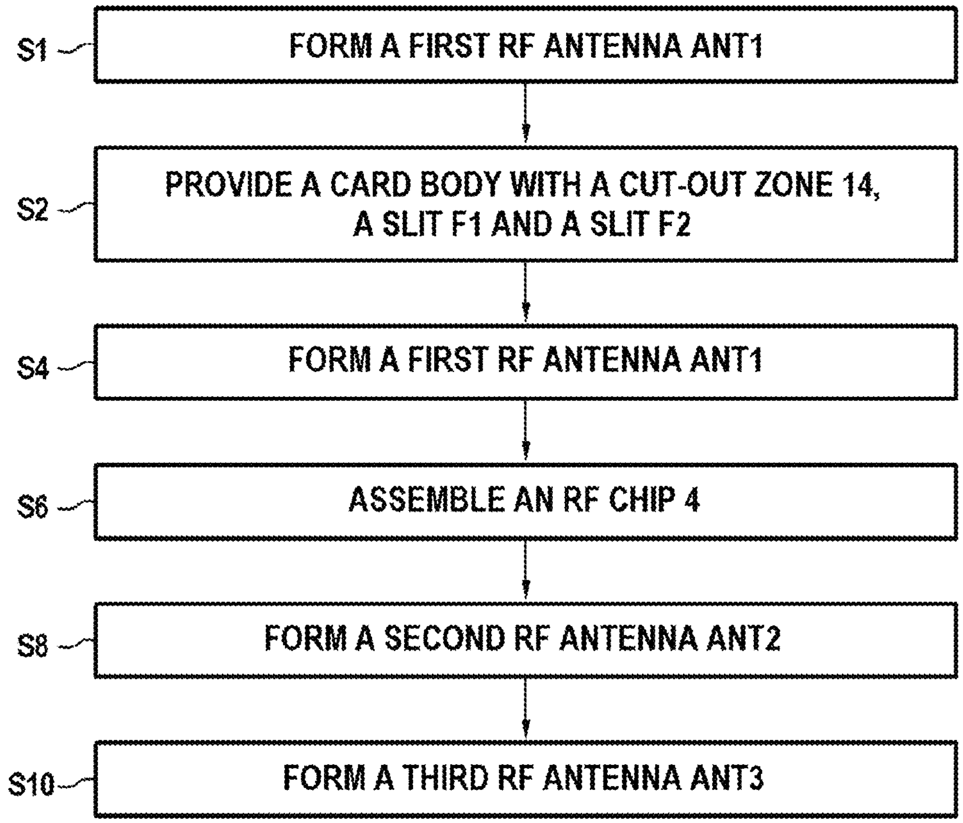
FIG. 15 shows, in the form of a flowchart, the steps of a process for manufacturing a chip card of the invention, according to at least one particular embodiment.

FIG. 15 schematically shows a process for manufacturing one of the chip cards CD1 described above, according to at least one particular embodiment. In a providing step S2, a card body 6 comprising a metal layer 8 such as described above is formed (or provided). In particular, this card body 6 is formed at least partly by a metal layer 8, this metal layer 8 comprising a cut-out zone 14.

The metal layer 8 is considered to consist of a first region R1 and a second region R2 that are entirely delineated by a straight line LIM parallel to a short side of the card CD1, the first region R1 completely containing the cut-out zone 14, its area being smaller than the area of the second region R2.

The metal layer comprises a first slit F1 that connects the cut-out zone to a peripheral edge 8*a* of the metal layer and a second slit F2 that opens either onto a peripheral edge of the metal layer or into the cut-out zone 14, the second slit F2 ending with a closed portion in the second region R2.

In a forming step S4, a first RF antenna ANT1 is formed (or assembled) on or in the card body 6 in or facing the cut-out zone 14 of the metal layer 8, as already described.

In an assembling step S6, an RF chip 4 is assembled with the card body 6 in such a way that the RF chip 4 is electrically connected to the first RF antenna, as described above.

In one embodiment, an insulating layer (solder mask) is formed for insulating the first antenna ANT1 from the second and third antennas ANT2, ANT3 formed in steps S8 and S10. In a forming step S8, a second RF antenna ANT2 is formed (or assembled) on or in the card body 6 in such a way that the second RF antenna ANT2 is electrically insulated from the metal layer 8 and from the first RF antenna ANT1, as already described. In particular, the forming step S8 is carried out in such a way that the second RF antenna is intended to allow coupling to the first antenna, the second antenna comprising at least one turn located facing the first slit F1. The second antenna ANT2 is for example formed in an insulating sheath to insulate it from the third antenna ANT3 formed in step S10.

In a forming step S10, a third RF antenna ANT3 is formed (or assembled) on or in the card body 6 so that the third RF antenna ANT2 is electrically insulated from the metal layer 8, from the first RF antenna ANT1 and from the second RF antenna ANT2, as already described. The third antenna ANT3 is for example formed in an insulating sheath to insulate it from the second antenna ANT2.

In particular, the forming step S10 is carried out in such a way that the third RF antenna is intended to allow coupling to the first antenna, the third antenna comprising at least one turn located facing the second slit F2.

Those skilled in the art will understand that the embodiments and variants described above are merely non-limiting exemplary implementations of the invention. In particular, those skilled in the art will be able to envisage any adaptation or combination of the embodiments and variants described above, in order to meet a particular need according to the claims presented below.

In one embodiment, the metal layer 8 is at least partially covered by a coating that is more conductive than the metal layer. Preferably, it is covered completely by this conductive coating but, when using a coating, said coating is at least present in the zone of flow of the main loops of the eddy currents.

The coating has for example a conductivity greater than $3.5\times10^7$ S/m. It may for example be made of copper, silver or gold.

The invention claimed is:

1. A chip card comprising:

a rectangular card body formed at least in part by a metal layer comprising a cut-out zone;

an RF chip;

a first RF antenna that is placed in or facing the cut-out zone and electrically connected to the RF chip, said metal layer consisting of a first region and a second region that are delineated by a straight line parallel to a short side of the card, the first region containing the cut-out zone, a first slit connecting the cut-out zone to a peripheral edge of the first region;

a second slit opening either onto a peripheral edge of the metal layer or into the cut-out zone, the second slit ending with a closed portion in the second region; and a second RF antenna electrically insulated from the metal layer and from the first RF antenna and configured to allow coupling to the first antenna, the second antenna comprising at least one turn facing the first slit; and a third RF antenna electrically insulated from the metal layer, from the first RF antenna and from the second RF antenna and configured to allow coupling to the first antenna, the third antenna comprising at least one turn located facing said second slit.

2. The chip card according to claim 1, wherein the second RF antenna comprises:

a first antenna portion extending facing a peripheral zone of the metal layer, at least one turn of said first antenna portion extending facing the first slit, and a second antenna portion, electrically connected to the first antenna portion, and extending facing the cut-out zone to allow coupling to the first antenna, the first antenna portion being configured to collect an image current induced by first eddy currents flowing on an edge through the metal layer when the chip card is subjected to an electromagnetic field under operating conditions of the chip card, and wherein the third RF antenna comprises:

a first antenna portion arranged at least partially facing the second region of the metal layer, at least one turn of said first antenna portion extending facing the second slit, and a second antenna portion, electrically connected to the first antenna portion, and extending facing the cut-out zone to allow coupling to the first antenna, the first portion of the third antenna being configured to collect an image current induced by eddy currents flowing through the second region of the metal layer when the chip card is subjected to an electromagnetic field under adverse operating conditions corresponding to only some of said operating conditions, and a path of the second and third antennas being configured such that the current flow flows in the same direction in:
the first portion of the second antenna,
the second portion of the second antenna,
the first portion of the third antenna, and
the second portion of the third antenna.

3. The chip card according to claim 2, wherein the adverse operating conditions are conditions under which the card is off-centre with respect to an antenna of a device generating said electromagnetic field.

4. The chip card according to claim 3, wherein said second region comprises a special zone for exploitation of eddy currents, said second antenna being located opposite the second slit in said special zone.

5. The chip card according to claim 2, wherein said second region comprises a special zone for exploitation of eddy currents, said second antenna being located opposite the second slit in said special zone.

6. The chip card according to claim 2, wherein the metal layer is at least partially covered by a coating that is more conductive than the metal layer.

7. The chip card according to claim 1, wherein said second region comprises a special zone for exploitation of eddy currents, said second antenna being located opposite the second slit in said special zone.

8. The chip card according to claim 7, wherein said special zone for exploitation of eddy currents is a zone of a surface of the card that is subjected to a uniform maximum-strength magnetic field whatever operating conditions of the card.

9. The chip card according to claim 8, wherein said special zone for exploitation of eddy currents is a disc centred on said card and a radius of which corresponds to the radius of an operational volume of said card.

10. The chip card according to claim 7, wherein said special zone for exploitation of eddy currents is a disc centred on said card and a radius of which corresponds to the radius of an operational volume of said card.

11. The chip card according to claim 10, wherein the chip card complies with EMVCo standard, said special zone for exploitation of eddy currents being a disc of 25 mm radius centred on said card.

12. The chip card according to claim 1, wherein the metal layer is at least partially covered by a coating that is more conductive than the metal layer.

13. The chip card according to claim 12, wherein the metal layer is entirely covered by said coating.

14. The chip card according to claim 13, wherein a thickness of the coating is greater than a skin depth of said coating.

15. The chip card according to claim 13, wherein the conductivity of said coating is greater than $3.5\times10^7$ S/m.

16. The chip card according to claim 13, wherein said coating is made of copper, silver or gold.

17. The chip card according to claim 12, wherein a thickness of the coating is greater than a skin depth of said coating.

18. The chip card according to claim 12, wherein the conductivity of said coating is greater than $3.5\times10^7$ S/m.

19. The chip card according to claim 12, wherein said coating is made of copper, silver or gold.

20. A method of manufacturing a chip card of generally rectangular shape from a card body formed at least in part by a metal layer, said metal layer comprising a cut-out zone, said metal layer consisting of a first region and a second region entirely delineated by a straight line parallel to a short side of the card, the first region completely containing the cut-out zone and its area being smaller than the area of the second region, a first slit in the metal layer connecting the cut-out zone to a peripheral edge of the first region and a second slit in the metal layer opening either onto a peripheral edge of the metal layer or into the cut-out zone, the second slit ending with a closed portion in the second region, the method comprising:

forming, on or in the card body, a first RF antenna in or facing the cut-out zone of the metal layer;

assembling an RF chip with the card body so that the RF chip is electrically connected to the first RF antenna;

forming, on or in the card body, a second RF antenna so that the second RF antenna is electrically insulated from the metal layer and from the first RF antenna, the second antenna being configured to allow coupling to the first antenna, the second antenna comprising at least one turn located facing the first slit; and forming, on or in the card body, a third RF antenna so that the third RF antenna is electrically insulated from the metal layer, from the first RF antenna and from the second RF antenna, the third antenna being configured to allow coupling to the first antenna, the third antenna comprising at least one turn located facing the second slit.

* * * * *